(12) United States Patent
Mazumdar et al.

(10) Patent No.: US 9,197,902 B2
(45) Date of Patent: Nov. 24, 2015

(54) WAVELET TRANSFORMATION USING MULTICORE PROCESSORS

(75) Inventors: Dipayan Mazumdar, Bangalore (IN); Cyril Prasanna Raj P, Bangalore (IN); Brahmananda Reddy Ganda, Kurnool District (IN)

(73) Assignee: M.S. Ramaiah School of Advanced Studies, Bangalore (IN)

(*) Notice: Subject to any disclaimer, the term of this patent is extended or adjusted under 35 U.S.C. 154(b) by 1010 days.

(21) Appl. No.: 13/320,748

(22) PCT Filed: Jan. 14, 2011

(86) PCT No.: PCT/IB2011/050167
§ 371 (c)(1),
(2), (4) Date: Nov. 15, 2011

(87) PCT Pub. No.: WO2012/073122
PCT Pub. Date: Jun. 7, 2012

(65) Prior Publication Data
US 2012/0236945 A1    Sep. 20, 2012

(30) Foreign Application Priority Data
Nov. 30, 2010  (IN) ............................ 3635/CHE/2010

(51) Int. Cl.
*H04N 7/12*  (2006.01)
*H04N 19/436*  (2014.01)
(Continued)

(52) U.S. Cl.
CPC ............. *H04N 19/436* (2014.11); *H04N 19/63* (2014.11); *H04N 19/42* (2014.11)

(58) Field of Classification Search
CPC ...... H04N 19/42; H04N 19/436; H04N 19/63
USPC ..................... 375/240.19, E07.226, E7.226
See application file for complete search history.

(56) References Cited

U.S. PATENT DOCUMENTS 6,055,554 A * 4/2000 Schwarz .................. 708/503
6,310,963 B1   10/2001 Erdol et al.
(Continued)

FOREIGN PATENT DOCUMENTS

JP    01273414    1/1989
JP    06332933    2/1994
(Continued)

OTHER PUBLICATIONS

"Horner scheme," accessed at http://web.archive.org/web/20100930175720/http://en.wikipedia.org/wiki/Horner_scheme, last modified on Aug. 21, 2010, pp. 1-7.
(Continued)

*Primary Examiner* — Sath V Perungavoor
*Assistant Examiner* — Dakshesh Parikh
(74) *Attorney, Agent, or Firm* — Turk IP Law, LLC

(57) ABSTRACT

A method for wavelet based data compression comprising: receiving data associated, with a set of pixels, computing wavelet coefficients by applying a series of Discrete Wavelet Transform (DWT) low-pass and high-pass filtering operations, wherein a number of filtering operations is reduced by: identifying common partial products for at least one of the lowpass filtering operations and the high-pass filtering operations, classifying a first portion of the wavelet coefficients as low magnitude coefficients and a second portion of the wavelet coefficients as high magnitude coefficients, eliminating the common partial products for the high magnitude wavelet coefficients, replacing multiplication operations for the low magnitude wavelet coefficients with shift-and-add operations, and eliminating the common partial products, and applying the DWT based on remaining filtering operations.

22 Claims, 22 Drawing Sheets

(51) Int. Cl.
*H04N 19/63* (2014.01)
*H04N 19/42* (2014.01)

(56) References Cited

U.S. PATENT DOCUMENTS

| | | | |
|---|---|---|---|
| 6,353,634 | B1 | 3/2002 | Houlberg |
| 6,584,111 | B1 | 6/2003 | Aweya et al. |
| 6,614,847 | B1 | 9/2003 | Das et al. |
| 6,643,406 | B1 | 11/2003 | Hajjahmad et al. |
| 6,757,343 | B1 | 6/2004 | Ortega et al. |
| 6,976,046 | B2 | 12/2005 | Guevorkian et al. |
| 7,170,941 | B2 | 1/2007 | Shives et al. |
| 7,577,290 | B2 | 8/2009 | Ikeda et al. |
| 7,587,099 | B2 | 9/2009 | Szeliski et al. |
| 7,590,589 | B2 | 9/2009 | Hoffberg |
| 7,646,924 | B2 | 1/2010 | Donoho |
| 7,715,928 | B1 | 5/2010 | Ciancio et al. |
| 7,751,873 | B2 | 7/2010 | de Voir |
| 7,805,386 | B2 | 9/2010 | Greer |
| 8,842,940 | B1 * | 9/2014 | Gee et al. ............ 382/302 |
| 2002/0143832 | A1 | 10/2002 | Acharya |
| 2002/0181404 | A1 * | 12/2002 | Insler et al. ............ 370/241 |
| 2003/0046322 | A1 | 3/2003 | Guevorkian |
| 2003/0065489 | A1 | 4/2003 | Guevorkian et al. |
| 2003/0204499 | A1 * | 10/2003 | Shahabi et al. ............ 707/3 |
| 2004/0101200 | A1 * | 5/2004 | Peele et al. ............ 382/218 |
| 2004/0189673 | A1 * | 9/2004 | Kwong ............ 345/626 |
| 2004/0223655 | A1 | 11/2004 | Liao et al. |
| 2006/0206744 | A1 | 9/2006 | Cadambi et al. |
| 2006/0294169 | A1 * | 12/2006 | Fallah et al. ............ 708/200 |
| 2008/0056372 | A1 * | 3/2008 | Lin et al. ............ 375/240.19 |

FOREIGN PATENT DOCUMENTS

| | | |
|---|---|---|
| JP | 07046085 | 2/1995 |
| JP | 11306166 | 5/1999 |
| JP | 2002543483 A | 12/2002 |
| JP | 2005500595 A | 1/2005 |
| KR | 1020100012453 | 8/2010 |
| KR | 1020110020144 A | 2/2011 |
| WO | 2010132278 A2 | 11/2010 |

OTHER PUBLICATIONS

Chen, Y-J., et al., "Multiplierless Approximation of Transforms With Adder Constraint," IEEE Signal Processing Letters, vol. 9, No. 11, pp. 344-347 (Nov. 2002).

Dang, P.P., and Chau. P.M., "Discrete Wavelet Transform for image Compression: A Hardware Approach," Proceedings of the SPIE Medical Imaging, vol. 3658, pp. 11 (Feb. 1999).

Dia, D., et al., "Muiti-level Discrete Wavelet Transform Architecture design," Proceedings of the World Congress on Engineering, vol. 1, pp. 1-5 (Jul. 1-3, 2009).

Ferentinos, V., et al., "Memory Compaction and Power Optimization for Waveiet-Based Coders," Integrated Circuit and System Design, Power and Timing Modeling, Optimization and Simulation Lecture Notes in Computer Science, vol. 2799, pp. 328-337 (2003).

Son et al., "An efficient VLSI Architecture of 9/7 DWT filter using shift-adder for JPEG2000", 2 pages, 28th Conference of Korea Information Processing Society Conference Proceedings, vol. 14, Issue 2, Nov. 2007.

Notice of Preliminary Rejection for KR Patent Application No. 10-2013-7017215 dated May 22, 2014.

International Preliminary Report on Patentability for PCT/IB2011/050167 filed Jan. 14, 2011, mailed on Jun. 13, 2013, issued Jun. 4, 2013.

Guo et al., "VLSI Implementation of Mallat's Fast Discrete Wavelet Transform Algorithm with Reduced Complexity", IEEE Global Telecommunications Conference (2001) vol. 1, pp. 320-324.

Pirsch et al., "VLSI Architectures for MPEG-4, Proceedings 2003 International Symposium on VLSI Technology", Systems, and Applications (Apr. 2003) http://www.ims.uni-hannover.de/pubget.php?uid=388.

Meter et al., "Hardware-Efficient Systolic-Like Modular Design for Two-Dimensional Discrete Wavelet Transform", IEEE Transactions on circuits and Systems (Feb. 2008) vol. 55, No. 2, p. 151-155.

Mohanty et al., "Concurrent Systolic Architecture for High-Throughput Implementation 3-Dimensional Discrete Wavelet Transform", IEEE Transaction (Jun. 2008) vol. 1, No. 2, p. 162-166.

Parhi et al., "VLSI Architectures for Discrete Wavelet Transforms", IEEE Transactions on VLSI Systems (Jul. 1993) vol. I, No. 2, p. 191-202.

Vishwanath et al., "Discrete Wavelet Transform in VLSI", Proceeding of International Conference on Application Specific Array Processors, pp. 218-229, 1992.

Acharya, "A Systolic Architecture for Discrete Wavelet Transforms" IEEE Transaction (1997) vol. 1, No. 2, p. 571-574.

Pan et al., "New Systolic Array for Computation of 1-D Discrete Wavelet Transforms" IEEE Transaction (1997) p. 4113-4116.

Acharya, "A High Speed Reconfigurable Integrated Architecture for DWT", Intel Corporation, CH6-428 5000 W. Chandler Blvd., Chandler, AZ 85226-3699 (1997) pp. 669-973.

Daubechies et al., "Factoring Wavelet Transforms into Lifting Steps", Sep. 1996, revised Nov. 1997.

International Search Report and Written Opinion for PCT/IB2011/050167 mailed Jan. 14, 2011.

\* cited by examiner

WAVELET TRANSFORMATION USING MULTICORE PROCESSORS

CROSS-REFERENCE TO RELATED APPLICATIONS

This application is the National Stage filing under 35 U.S.C. §371 of PCT Application Ser. No. PCT/IB11/50167 filed on Jan. 14, 2011, which claims priority under 35 U.S.C. §119 (a) and (b) to benefit of Indian Patent Application No. 3635/CHE/2010 filed on Nov. 30, 2010. The disclosures of the PCT Application and the Indian Patent Application are hereby incorporated by reference in their entireties.

BACKGROUND

Unless otherwise indicated herein, the materials described in this section are not prior art to the claims in this application and are not admitted to be prior art by inclusion in this section.

Multi-core processors are integrated circuits (IC) containing multiple processor cores. In general, a core is a processing unit such as a central processing unit (CPU), and processes executable modules (instructions or code) to provide one or more desired functions or applications. Multi-core processors often need to accept and process data generated by one or more external data sources such as, for example, analog-to-digital converters (ADC), sensor-arrays, etc. Simple bus-based data interface to processors may not be able to accommodate data collection from a large number of sources, especially when such data collection needs to performed in substantially parallel fashion. Multicore processors are able to perform signal processing on multiple channels of data in real time.

Wavelet transformations are commonly used in image compression systems. The wavelet transform based schemes are gaining popularity in image and video compression because they perform better than other transforms like Fast Fourier Transform (FFT) or Discrete Cosine Transform (DCT) blocking artifacts and providing increased temporal and spatial resolution both in time and frequency. Moreover, the demand on higher mobility of multimedia content across different platforms emphasizes high degrees of scalability in spatial, temporal and quality domains. Wavelets are well suited to achieve these goals.

SUMMARY

The following summary is illustrative only and is not intended to be in any way limiting. In addition to the illustrative aspects, embodiments, and features described above, further aspects, embodiments, and features will become apparent by reference to the drawings and the following detailed description.

The present disclosure generally describes technologies related to wavelet based data compression.

Some example methods described herein may include receiving data associated with a set of pixels and computing wavelet coefficients by applying a series of Discrete Wavelet Transform (DWT) low-pass and high-pass filtering operations. During the computation, a number of filtering operations is reduced by identifying common partial products for at least one of the low-pass filtering operations and the high-pass filtering operations and eliminating the common partial products. The method may also include applying the DWT based on remaining filtering operations.

Other example methods described herein may include receiving data associated with a set of pixels, word-serially loading each pixel to a multicore processor for Discrete Wavelet Transform (DWT) performed by a series of low-pass and high-pass filtering operations, and applying the DWT based on remaining filtering operations. A number of filtering operations in the computation process may be reduced by identifying common partial products for at least one of the low-pass filtering operations and the high-pass filtering operations, sorting wavelet coefficients resulting from the filtering operations based on their respective magnitudes, classifying a first portion of the wavelet coefficients as low magnitude coefficients and a second portion of the wavelet coefficients as high magnitude coefficients, eliminating common partial products for the high magnitude wavelet coefficients, and/or replacing multiplication operations for the low magnitude wavelet coefficients with shift-and-add operations.

Some example integrated circuits (ICs) for performing wavelet based data compression according to at least some embodiments may include a first network-on-chip (NOC) adapted to receive data associated with a set of pixels and word-serially load each pixel to a plurality of cores and the plurality of cores each core comprising a high-pass processing element and a low-pass processing element to perform Discrete Wavelet Transform (DWT). The plurality of cores may identify common partial products for at least one of the low-pass filtering operations and the high-pass filtering operations and eliminate the common partial products in performing the DWT. The IC may also include a second NOC adapted to unload each transformed value in a word-serial manner from the plurality of cores.

BRIEF DESCRIPTION OF THE DRAWINGS

The foregoing and other features of this disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
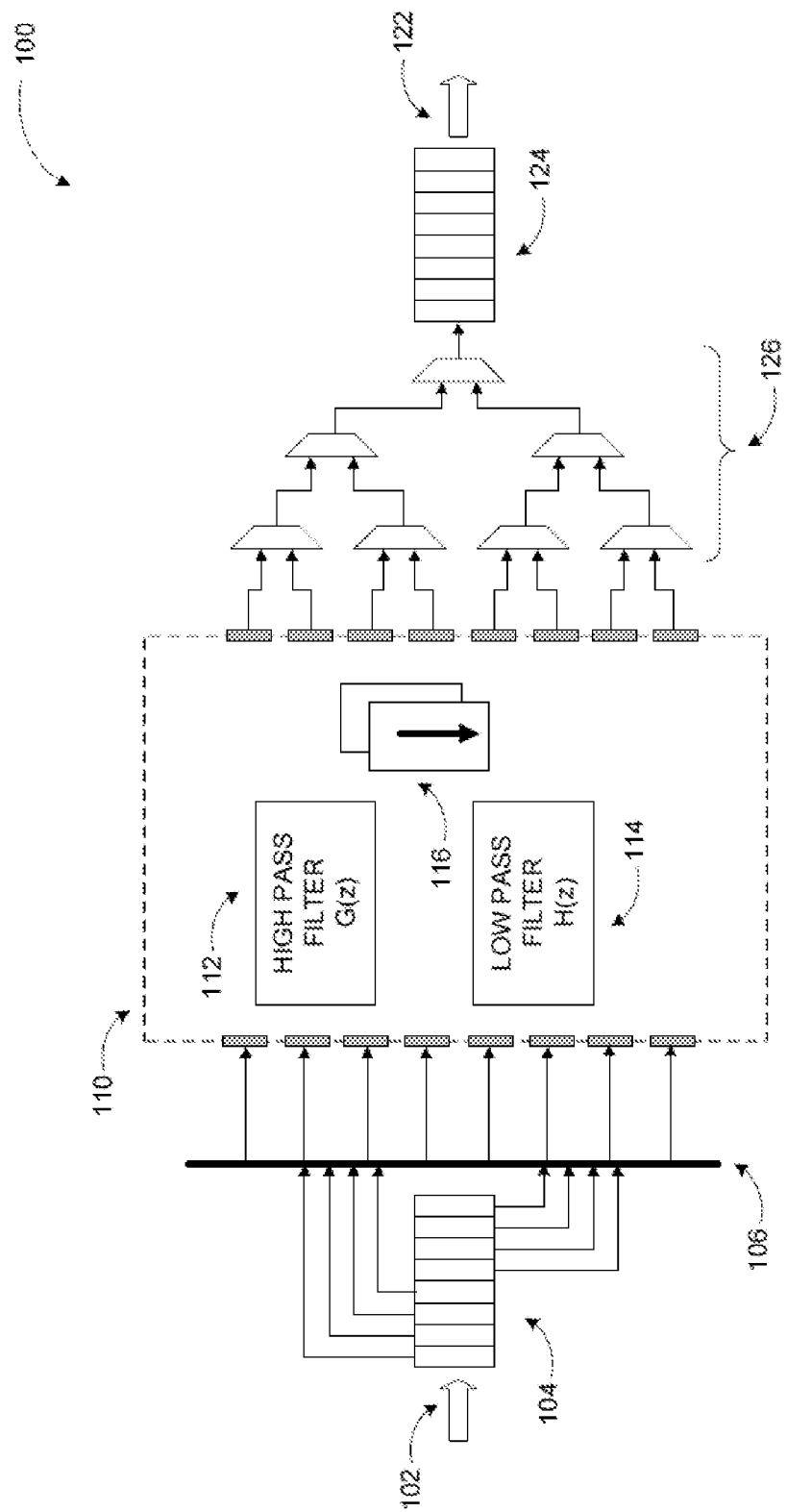
FIG. 1 illustrates a block diagram for an example wrapper for a Mallat processing module.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented herein. It will be readily understood that the aspects of the present disclosure, as generally described herein, and illustrated in the Figures, can be arranged, substituted, combined, separated, and designed in a wide variety of different configurations, all of which are explicitly contemplated herein. This disclosure is generally drawn, inter alia, to methods, apparatus, systems, devices, and/or computer program products related to wavelet based data compression, specifically wavelet transformation using multicore processors.

Briefly stated, technologies generally described herein relate to enhancement of wavelet transformation in multicore processor environments by reduction of filtering operations employing identification and elimination of common partial products, replacement of a portion of the multiplication operations, and creation of a wrapper around the Mallat processor, which allows word-serially loading each pixel and unloading each transformed value in a word-serial manner.

FIG. 1 illustrates a block diagram for an example wrapper for a Mallat processing module. Video and audio signals have statistically stationary behavior over small time intervals. For these signals, it makes more sense to employ a transform technique that can be computed over a time window and then slide the time window forward to continue analyzing the signal. The discrete wavelet transform (DWT) of a signal produces a discrete time-frequency map. DWT utilizes optimality property of the Gaussian function to produce the best localization as determined by the Heisenberg product. DWT may be adjusted for broadband and narrowband signals with short sampling intervals for high frequency and longer sampling intervals for low frequency. The DWT is a discrete version of the continuous wavelets that may be better suited to digital implementation. The DWT is characterized by a frequency distribution that maintains a substantially constant ratio between the center frequency and its bandwidth represented by Q distribution, which can also be referred to as a constant Q distribution. Conventional wavelet transform circuitry may be utilized to perform the transformation with a large number of multiplication and addition operations, which may also result in high power consumption.

A multicore-directed wavelet transformation process according to at least some embodiments can be adapted to provide an efficient method of achieving wavelet based compression by reducing the numbers of operations and by reducing the storage required for the results of the numerous operations. This in turn may result in lower gate count, reduced memory, and/or reduced power consumption needed to carry out the operations compared to conventional wavelet transform methods. Embodiments may be implemented in multi-core processors or specialized integrated circuits such as Field Programmable Gate Arrays (FPGAs).

Power/component reduction and computational acceleration may be achieved by identification of common partial products, which can be computed once for a group of pixels that represent either an image or a video; replacement of multiplications for low magnitude coefficients by shift-and-add operations, for which the smallest coefficients may be selected; and creation of a wrapper around the Mallat, which can be utilized to facilitate word-serially loading of each pixel and unloading of each transformed value in a word-serial manner.

According to some example implementations, the principle of Lowest Partial Product First (LPPF) may be used to sort the wavelet coefficients based on their absolute magnitude and the partial products computed with the largest coefficients first. This approach may enable convergence to a final sum-of-products relatively quickly. Diagram 100 illustrates an example single stage Mallat processor 110 with a Serial In Parallel Out (SIPO) module 104 and a Parallel In Serial Out (PISO) module (126, 124), arranged in accordance with at least some embodiments described herein. The example Mallat processor 110 comprises high-pass filter 112, low-pass filter 114, and "by 2" decimation blocks 116. Optionally, the wrapper comprising the SIPO module 104, distribution bus 106, and PISO module (124, 126) may be an integral part of the Mallat processor 110 reducing its I/O count substantially. Reducing the I/O count has the additional effect of reducing the power dissipation due to toggling the I/O. A serially provided input 102 may be converted to parallel for feeding into the processor and the parallel output of the processor may be converted back to a serial output 122.

The example components and configurations in diagram 100 are for illustration purposes only and do not constitute a limitation on embodiments. A Mallat processor for performing DWT operations and a wrapper for serial/parallel and back conversions may be implemented using a number of different components, configurations, and/or processor types. Furthermore, a typical processor according to some embodiments may have multiple high pass filters and/or multiple low-pass filters, which may be implemented as cascaded stages.

Figure 2:
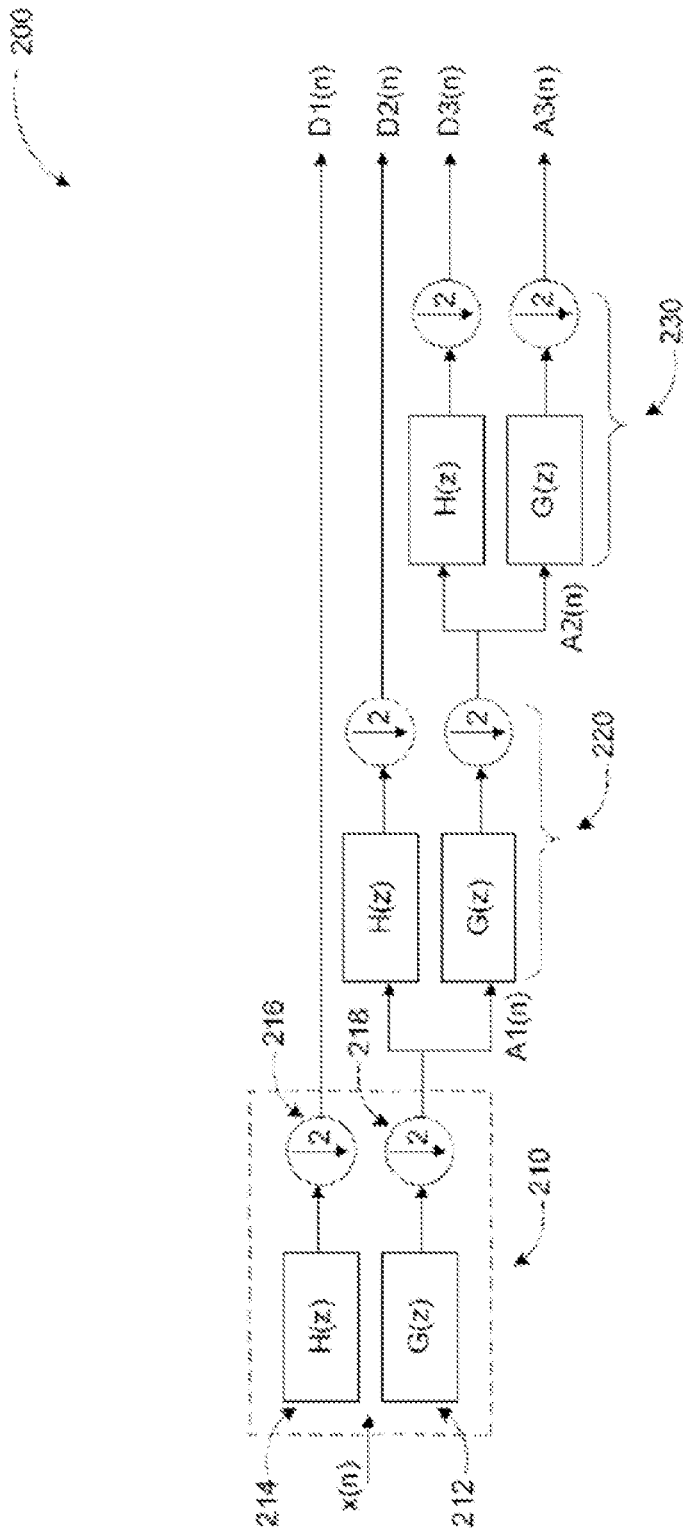
FIG. 2 illustrates an example Mallat filter bank.

FIG. 2 illustrates an example Mallat filter bank arranged in accordance with at least some embodiments described herein. The DWT may be computed by successive operations of low-pass and high-pass filtering of the discrete time-domain signal, x(n), where n is an integer. This is called the Mallat algorithm or Mallat-tree decomposition. The low-pass filter operation 214 is denoted by H(z) while the high-pass filter operation 212 is denoted by G(z). A Mallat processor may be configured to employ any number of filtering stages. The example in diagram 200 includes three filtering stages 210, 220, and 230. In summary, DWT decomposes an arbitrary input sequence $X=\{X_0, X_1, X_2, \ldots, X_{N-1}\}$ into low-pass sub-band $a=\{a_0, a_1, \ldots, a_{N/2-1}\}$ and high-pass sub-band $d=\{d_0, d_1, \ldots, d_{N/2-1}\}$, which may be represented as:

$$a_n = \Sigma h_{2n-k} x_k; d_n = \Sigma g_{2n-k} x_k; \Lambda, \quad [1]$$

where k=0 to N/2−1, where $g_i$ and $h_i$ are the high-pass and low-pass filter coefficients, respectively. According to some embodiments, a 9-7 bi-orthogonal spline filter may be used in the filtering stages of the Mallat processor. The 9-7 bi-orthogonal spline filter includes 9 low-pass filter coefficients $\{h_{-4}, \ldots, h_{-1}, h_0, h_1, \ldots, h_4\}$ and 7 high-pass filter coefficients $\{g_{-2}, g_{-1}, g_0, g_1, \ldots, g_4\}$.

The low-pass filter coefficients are symmetric, i.e., $h_{-i}=h_i$. The high-pass filter coefficients are related by $g_i=(-1)^i \hat{h}_{1-i}$ and $\hat{h}_{-i}=\hat{h}_i$, where $\{\hat{h}_{-3}, \hat{h}_{-2}, \hat{h}_{-1}, \hat{h}_0, \hat{h}_1, \hat{h}_2, \hat{h}_3\}$ are 7 low-pass filter coefficients that can be used for reconstruction of the signal. Hence, $g_{-2}=\hat{h}_3=g4$; $g_{-1}=\hat{h}_2=g_3$; $g_0=\hat{h}_1=g_2$.

The outputs of both filters operations (212, 213) may be decimated through decimation elements 216 and 218, and the results, which form the coefficients may be sent on to the next stage and the process continue through all filtering stages of the processor. The decimation elements may perform a decimation in time by a factor of 2.

The low-pass sub-band samples $a_n$, for n=0, 1, . . . . N/2−1 may be expressed in matrix form. The matrix may be rearranged for a signal vector of length 8 resulting in the matrix equation (for an example 8×8 implementation):

$$\begin{bmatrix} h0 & h1 & h2 & h3 & h4 & 0 & 0 & 0 \\ h2 & h1 & h0 & h1 & h2 & h3 & h4 & 0 \\ h4 & h3 & h2 & h1 & h0 & h1 & h2 & h3 \\ 0 & 0 & h4 & h3 & h2 & h1 & h0 & h1 \\ 0 & 0 & 0 & 0 & h4 & h3 & h2 & h1 \\ 0 & 0 & 0 & 0 & 0 & 0 & h4 & h3 \\ 0 & 0 & 0 & 0 & 0 & 0 & 0 & 0 \\ 0 & 0 & 0 & 0 & 0 & 0 & 0 & 0 \end{bmatrix} \begin{bmatrix} x0 \\ x1 \\ x2 \\ x3 \\ x4 \\ x5 \\ x5 \\ x7 \end{bmatrix} = \begin{bmatrix} a0 \\ a1 \\ a2 \\ a3 \\ a4 \\ a5 \\ a6 \\ a7 \end{bmatrix} \quad [2]$$

The matrix equations may be written out in long form as:

$h0*x0+h1*x1+h2*x2+h3*x3+h4*x4=a0$ $h2x0+h1*x1+h0*x2+h1*x3+h2*x4+h3*x5+h4*x6=a1$ $h4*x0+h3*x1+h2*x2+h1*x3+h0*x4+h1*x5+h2*x6+h3*x7=a2$ $h4*x2+h3*x3+h2*x4+h1*x5+h0*x6+h1*x7=a3$ $h4*x4+h3*x5+h2*x6+h1*x7=a4$ $h4*x6+h3*x7=a5$ [3]

After identification of the common terms, the matrix equations may be written as:

$h0*x0+(h1x1)_{p3}+(h2*x2)_{p9}+(h3*x3)_{p10}+(h4*x4)_{p8}=a0$ $h2*x0+(h1*x1)_{p3}+h0*x2+(h1*x3)_{p4}+(h2*x4)_{p11}+(h3*x5)_{p11}+(h4*x6)_{p6}=a1$ $h4*x0+h3*x1+(h2*x2)_{p9}+(h1*x3)_{p4}+h0*x4+(h1*x5)_{p7}+(h2*x6+(h3*x7)_{p2}=a2$ $h4*x2+(h3*x3)_{p10}+(h2*x4)_{p11}+(h1*x5)_{p7}+h0*x6+(h1*x7)_{p5}=a3$ $(h4*x4)_{p8}+(h3*x5)_{p11}+(h2*x6+(h1*x7)_{p5}=a4$ $(h4*x6)_{p1}+(h3*x7)_{p2}=a5$ [4]

To calculate a total number of multiplication operations for computation of the Mallat wavelet transform the banded bi-orthogonal matrix may be written as a sum and a difference matrix. This matrix may then be simplified to a sum of simpler matrices. The minimal number of multiplication operations without any optimization may be, for row 1-5; row 2-7; row 3-8; row 4-6; row 4-4; and row 6-2 (real multiplications with floating point). Thus, the total number of multiplication operations is 32. This may be simplified using an additional step of performing elimination of common factors in the above equations for the low-pass filter. The common factors may be listed as:

h4*x6−a1 and a5; h3*x7−a1 and a5; h1*x1−a0 and a1; h1*x3−a1 and a2;

h1*x7−a3 and a4; h4*x4−a0 and a4; h2*x6−a2 and a4; h1*x5−a2 and a3;

h4*x4−a0 and a4; h2*x2−a0 and a2; h3*x3−a0 and a3; h2*x4−a1 and a3.

When the common terms are eliminated, there may be a substantial reduction in the number of multiplication operations to be performed (e.g., from 32 to 20). This reduction in multiplications corresponds to an operations reduction without any additional hardware cycles and to a reduction in the power budget of, for example, a VLSI chip, in which the circuits may be implemented with the common terms eliminated.

The operations may be further reduced for the remaining multiply-adds for low-pass filtering. After the 12 multiplication operations are eliminated h2 (second low-pass filter coefficient) needs 7 multiplication and third low-pass filter coefficient h3 needs 7 multiplications. Between h2 and h3, h3 is the smallest multiplier by a factor of 5. Thus, h3 will likely add the smallest overall approximation error. Performing shift and add operation instead of performing multiplications with the coefficients h2 and h3, 4 multiplication operations for h2 may be eliminated. Additional 5 multiplication operations for h3 may also be eliminated, resulting in a total of 9 additional multiplication operations being eliminated. This leaves 20−9=11 remaining multiplication operations for the low-pass operation.

Figure 5:
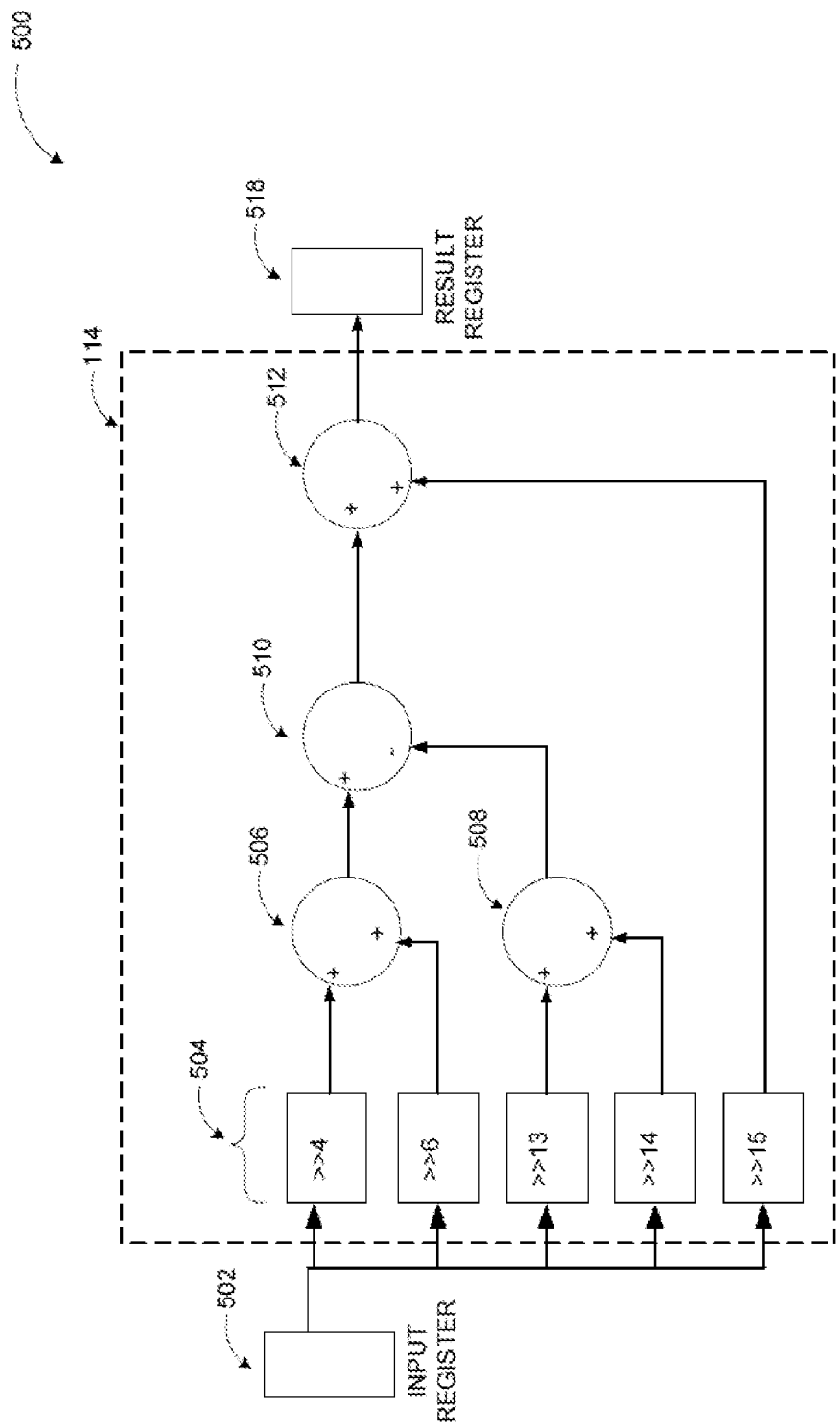
FIG. 5 illustrates a block diagram for Shift & Add operations for the second low-pass coefficient (h2) in a Mallat wavelet transformation circuit according to embodiments.
Figure 6:
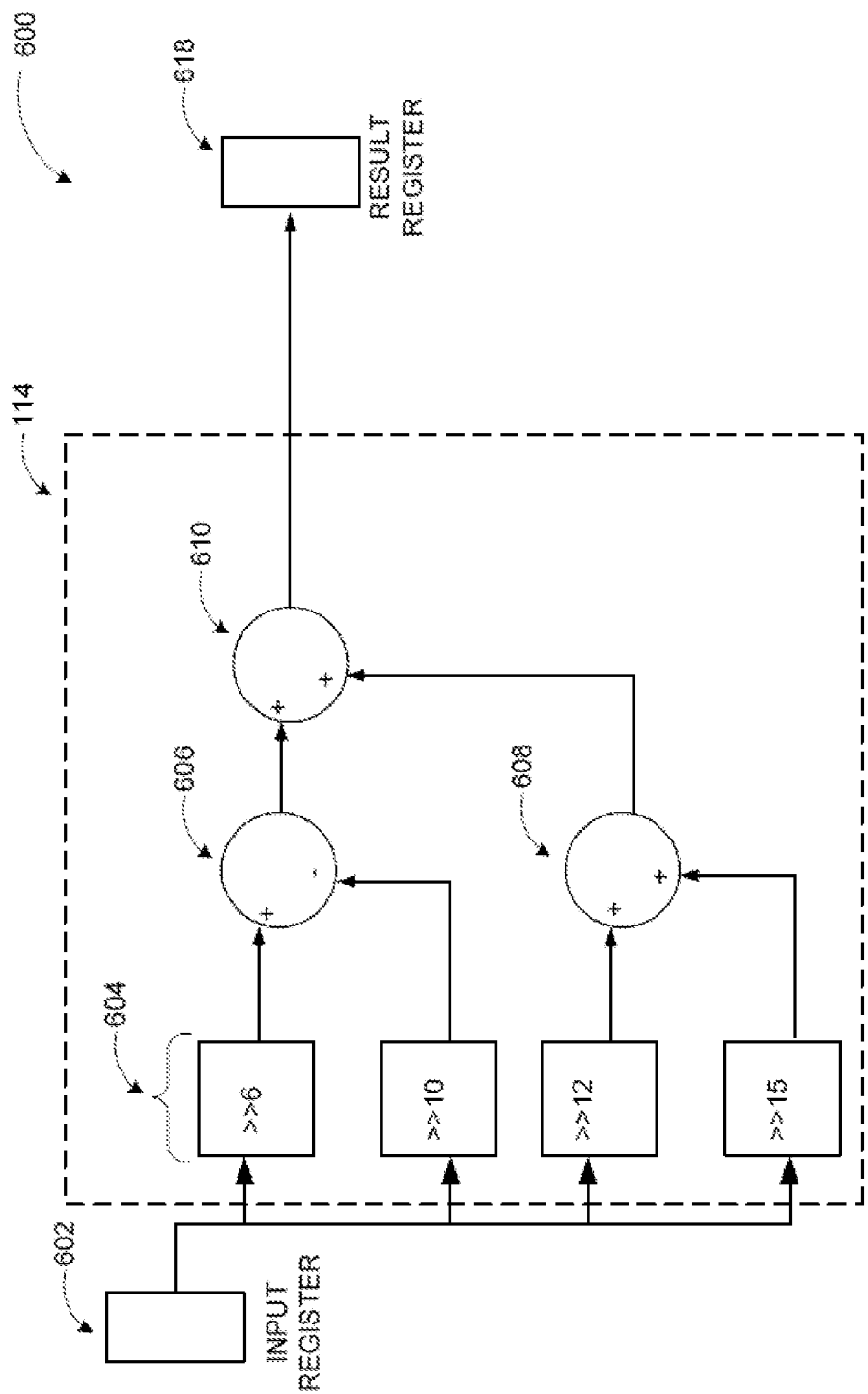
FIG. 6 illustrates a block diagram for Shift & Add operations for the third low-pass coefficient (h3) in a Mallat wavelet transformation circuit according to embodiments.

FIG. 5 and FIG. 6 illustrate a block diagram for shift & add operations for the second and third low-pass filter coefficients (h2 and h3) in a Mallat wavelet transformation circuit according to various embodiments described herein. As discussed above, the combined effect of replacing the two multiplications with addition and shifting may be that 4+5=9 multiplication operations are eliminated out of twenty (20) remaining multiplication operations.

The shift and add technique may be used to further remove nine (9) multiplication operations out of 20. For example, in computing h2 any multiplication by 0.0782232 may be replaced by a multiplication with 0.078125. The new multiplier may be implemented as powers of two operations. That is the multiplication operation may be replaced with a simple series of addition operations and shift operations. 0.0625+ 0.015625−0.0001221−0.000061+0.000031=0.078217, where the target multiplier is 0.0782232. Thus, 7 addition and shift operations may replace one floating point multiplication operation. As diagram 500 of FIG. 5 illustrates, the value from input register 502 may be subjected to the CSD (Canonical Shift Digit) operations as (2>>4+2>>6−2>>13−

2>>14+2>>15)=0.078217, followed by a series of adds and shifts (block 504, 506, 508, 510, 512) with the result 0.078217 in result register 518 for h2.

Diagram 600 of FIG. 6 illustrates how the multiplication with third low-pass filter coefficient h3 may be replaced also by a combination of addition and shift operations as (2>>6+ 2>>10+2>>12+2>>15)=0.016860 (604, 606, 608, 610) on the value from input register 602 with the result 0.016860 in result register 618 for h3. Thus, the shift and addition operations for h2 and h3 may reduce another 4 and 5 multiplication operations, respectively, in the low-pass filter process.

Similar to the low-pass operations, the high-pass sub-band samples $d_n$, for n=0, 1, . . . N/2−1 may be expressed in matrix form. The matrix may be rearranged for a signal vector of length 8 resulting in the matrix equation (for an example 8×8 implementation):

$$\begin{bmatrix} g2 & g3 & g4 & 0 & 0 & 0 & 0 & 0 \\ g2 & g1 & g2 & g3 & g4 & 0 & 0 & 0 \\ g4 & g3 & g2 & g1 & g2 & g3 & g4 & 0 \\ 0 & 0 & g4 & g3 & g2 & g1 & g2 & g3 \\ 0 & 0 & 0 & 0 & g4 & g3 & g2 & g1 \\ 0 & 0 & 0 & 0 & 0 & 0 & g4 & g3 \\ 0 & 0 & 0 & 0 & 0 & 0 & 0 & 0 \\ 0 & 0 & 0 & 0 & 0 & 0 & 0 & 0 \end{bmatrix} \begin{bmatrix} x0 \\ x1 \\ x2 \\ x3 \\ x4 \\ x5 \\ x6 \\ x7 \end{bmatrix} = \begin{bmatrix} d0 \\ d1 \\ d2 \\ d3 \\ d4 \\ d5 \\ d6 \\ d7 \end{bmatrix} \quad [5]$$

The matrix equations may be written out in long form as:

$g2x0+g3x1+g4x2=d0$ $g2x0+g1x1+g2x2+g3x3+g4x4=d1$ $g4x0+g3x1+g2x2+g1x3+g2x4+g3x5+g4x6=d2$ $g4x2+g3x3+g2x4+g1x5+g2x6+g3x7=d3$ $g4x4+g3x5+g2x6+g1x7=d4$ $g4x6+g3x7=d5$ [6]

After identification of the common terms, the matrix equations may be written as:

$(g2x0)_{p11}+(g3x1)_{p9}+(g4x2)_{p10}=d0$ $(g2x0)_{p11}+g1x1+(g2x2)_{p6}+(g3x3)_{p7}+(g4x4)_{p8}=d1$ $g4x0+(g3x1)_{p9}+(g2x2)_{p6}+g1x3)+(g2x4)_{p4}+(g3x5)_{p3}+ (g4x6)_{p5}=d2$ $(g4x2)_{p10}+(g3x3)_{p7}+(g2x4)_{p4}+g1x5+(g2x6)_{p2}+ (g3x7)_{p1}=d3$ $(g4x4)_{p8}+(g3x5)_{p3}+(g2x6)_{p2}+g1x7=d4$ $(g4x6)_{p5}+(g3x7)_{p1}=d5$ [7]

The matrix equations for high-pass filter coefficients in equation group [6] require 27 multiplications to form the Wavelet transform result. From the identified common terms are identified in the above long form equations, following multiplication operations may be eliminated: g3×7−d5 and d3; g4×6−d5 and d2; g4×4−d4 and d1; g3×5−d4 and d2; g2×6−d4 and d3; g2×0−d0 and d1; g3×1−d0 and d2; g4×2−d0 and d3; g3×3−d1 and d3; g2×2−d1 and d3; g2×4−d2 and d3. Thus, 6 multiplication operations may be saved in computation of high-pass sub-band samples d0, d1, d2, d3 and 5 operations may be saved in d4 and d5. The common products are shown in equation group [7].

For the high-pass filter using Mallat algorithm two different configurations may be employed, one based on the identification of common terms and the other based on the elimination of multiplication operations by shift and addition pipelined structures. In order to target lowest power dissipation, both approaches may be integrated according to some embodiments. The first approach removes the common terms thereby eliminating 11 redundant multiplication operations.

The original number of multiplication operations for the high pass Mallat filter being 27, elimination of 11 multiplication operations leaves 27−11=16 multiplication operations. After the 11 operations are eliminated, the operations for high-pass filter coefficient g2 include 7 multiply operations and for high-pass filter coefficient g3 8 multiply operations. Between the two, g3 is the smallest multiplier, thus, will likely add the smallest overall approximation error. So, the operations involving g3 may be performed first in accordance with at least some embodiments computing lowest partial product first. By performing addition and shift operations in lieu of multiplication operations for g2 and g3 additional multiplication operations may also be eliminated. Employing multiply adds for 4 multiplication operations for g2, those 4 may be eliminated. Additional 4 multiplication operations for g3 may be eliminated by replacing multiplication operations with shift and addition operations as demonstrated in FIG. 4 below. Thus, a total of 8 additional multiplication operations may be eliminated leaving 16−8=8 multiplication operations for the high pass operation.

Returning to FIG. 3 and FIG. 4, diagrams 300 and 400 illustrate flows for shift and add operations for the second and third high-pass filter coefficients (g2 and g3) in a Mallat wavelet transformation circuit. The shift and add operations help avoid 8 multiplications according to at least some embodiment.

According to an example scenario, for g2 any multiplication by 0.591271 may be replaced by a multiplication with 0.591796875. The new multiplier may be implemented as powers of two. That is the multiplication operation may be replaced with a simple series of adds and shifts like 0.5+0.0625+0.015625+0.007813+0.00390+0.00196− 0.0001221=0.5917, where the target multiplier is 0.59127.

Figure 3:
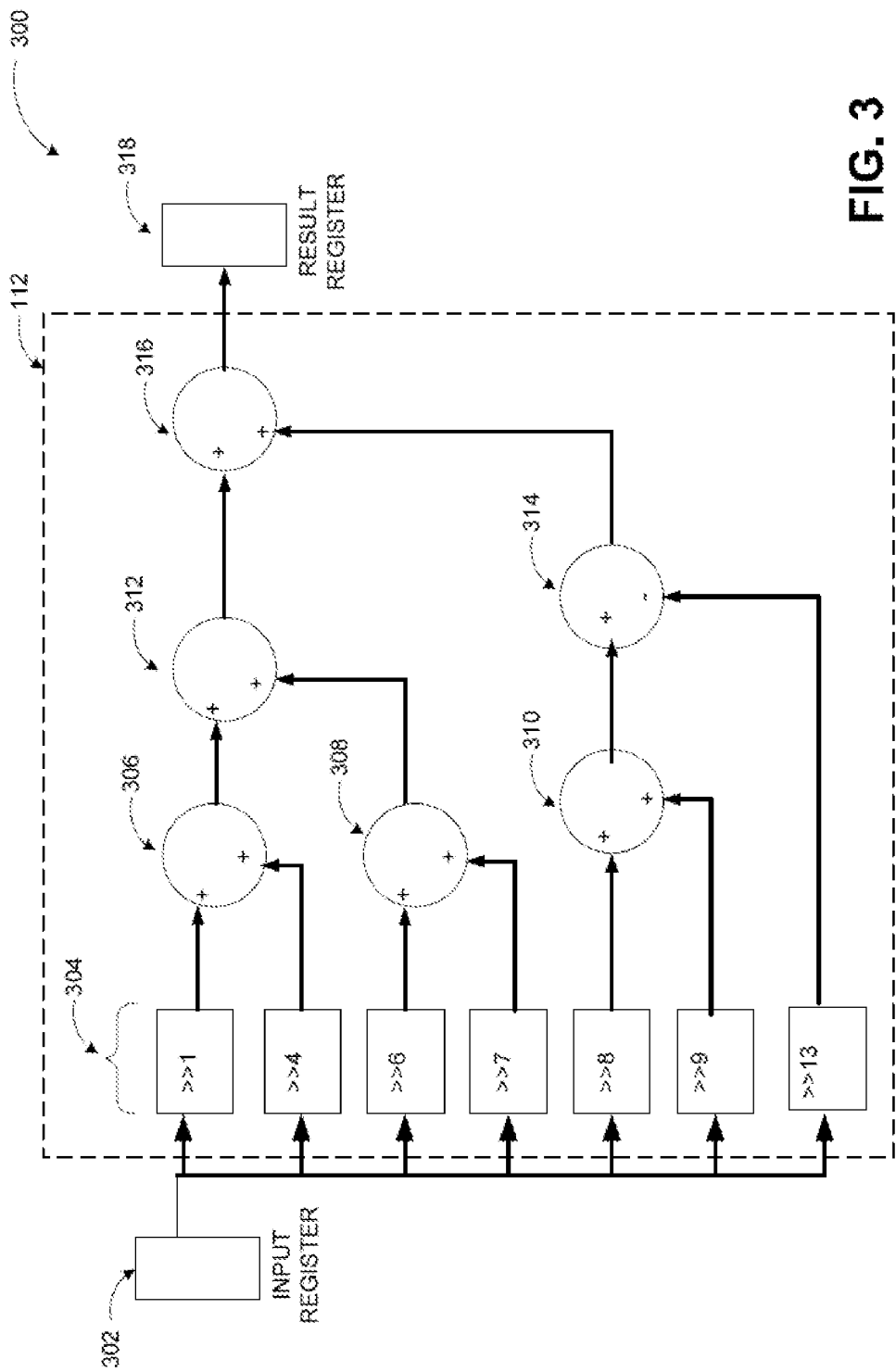
FIG. 3 illustrates a block diagram for Canonical Signed Digit (CSD) operations for the second high-pass coefficient (g2) in a Mallat wavelet transformation circuit according to embodiments.
Figure 4:
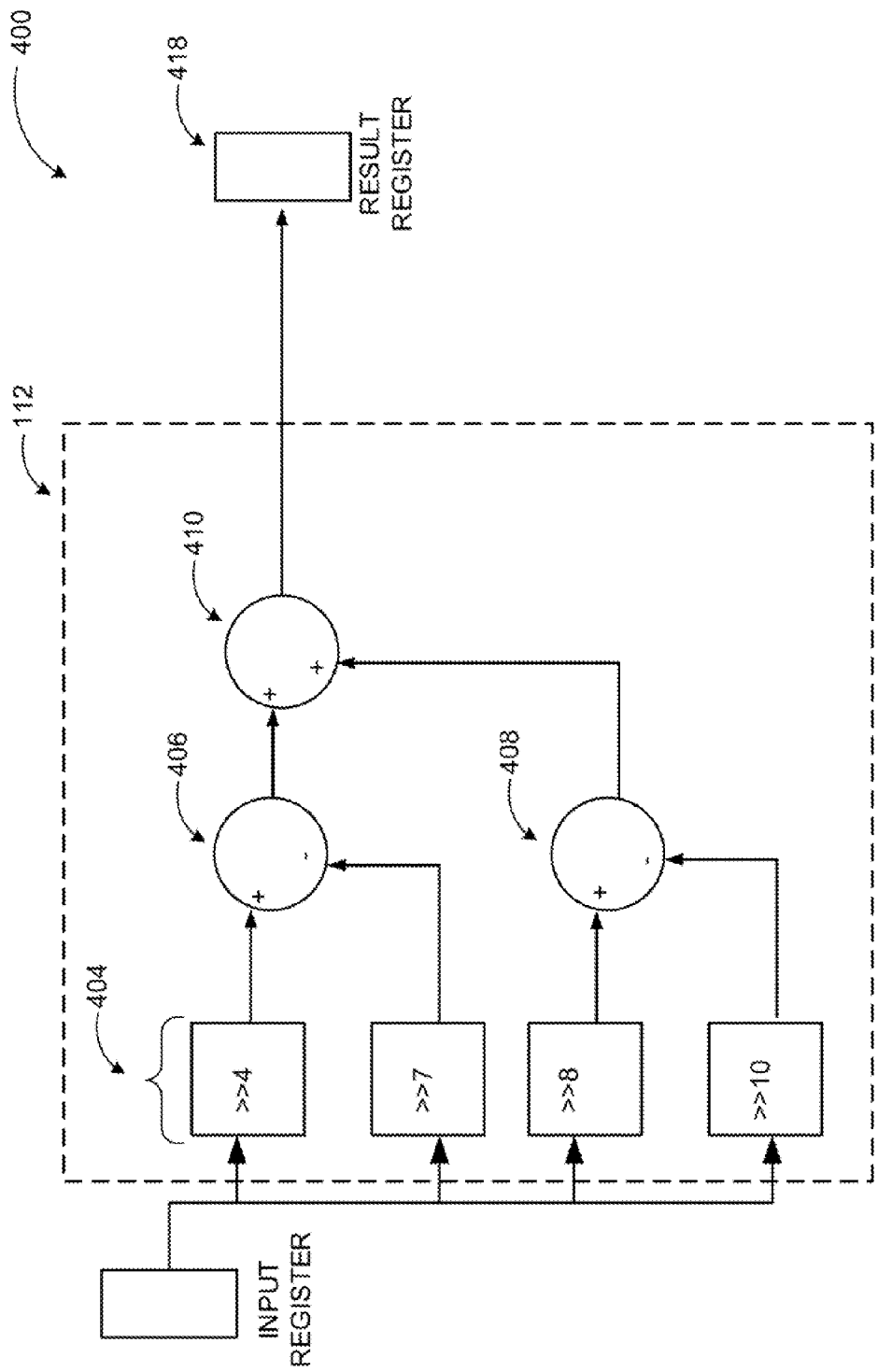
FIG. 4 illustrates a block diagram for Shift & Add operations for the third high-pass coefficient (g3) in a Mallat wavelet transformation circuit according to embodiments.

As diagram 300 of FIG. 3 illustrates, seven adds and shifts may replace one floating point multiplication (2>>1+2>>4+ 2>>6+2>>7+2>>8+2>>9−2>>13)=0.5917 (304, 306, 308, 310, 312, 314, 316) on the value from input register 302 with the result 0.05917 in result register 318 for g2. Diagram 400 of FIG. 4 illustrates how the multiplication with third high-pass filter coefficient g3 may be replaced also by a combination of addition and shift operations as 0.0576172=0.062500−0.007813+0.0039063−0.0009766 (2<<4−2<<7+2<<8−2<<10)=0.0576 (404, 406, 408, 410) with the result 0.0576172 in result register 418 for g3. Thus, the shift and addition operations for g2 and g3 may reduce another 4 multiplication operations each, in the high-pass filter process. This also provides a savings in consumed circuit power of the Wavelet processor.

It can be shown that the error magnitude is substantially small for the multiplications with g2 and g3. Such small errors imply power may be saved by replacing these multiplication operations with g2 and g3 with shift and addition operations as shown in FIGS. 3 and 4.

Figure 7:
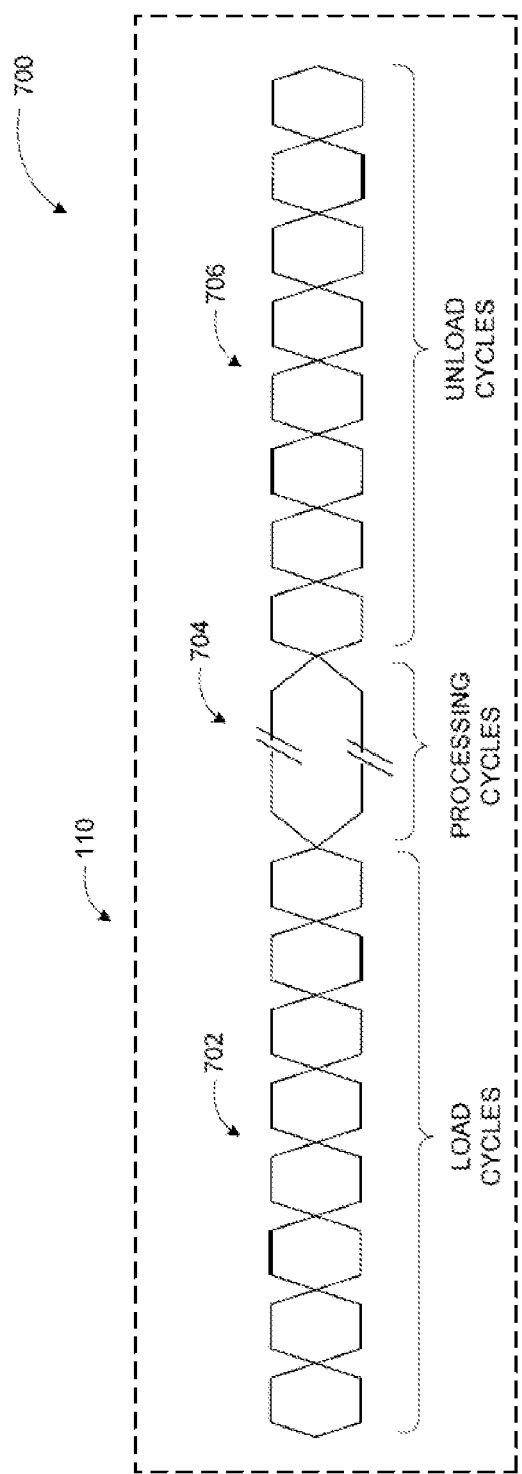
FIG. 7 illustrates example clock cycles during an operation of a Serial-In-Parallel-Out (SIPO)—Mallat—Parallel-In-Serial-Out (SIPO) wrapper.

FIG. 7 illustrates in diagram 700 example clock cycles during an operation of a Serial-In-Parallel-Out (SIPO)-Mallat-Parallel-In-Serial-Out (SIPO) wrapper.

External signals to control a SIPO-Mallat-PISO wrapper, as described in conjunction with FIG. 1, may include a load signal, a process signal, and an unload signal. During a first state 702, a load data stream, $X_n(0-7)$ may be received over 8 load cycles. This may be eight external clock cycles. At the same time as the load data stream is being received as an unload data stream $Y_{n-1}(0-7)$ for the preceding processed signal may be unloaded. Such a wrapper reduces the I/O count in case the Wavelet processor is implemented in an FPGA or a soft or hard IP.

During a second state 704, a process data stream, $X_n(0-7)$, may be handled, which may take one or two clock cycles. The second state 704 may be followed by a third state 706, during which an unload data stream, $Y_n(0-7)$ associated with the processed data stream, $X_n(0-7)$ may be unloaded lasting about eight external clock cycles according to an example embodiment. At the same time, the next load data stream $X_{n+1}(0-7)$ may be received.

Figure 8:
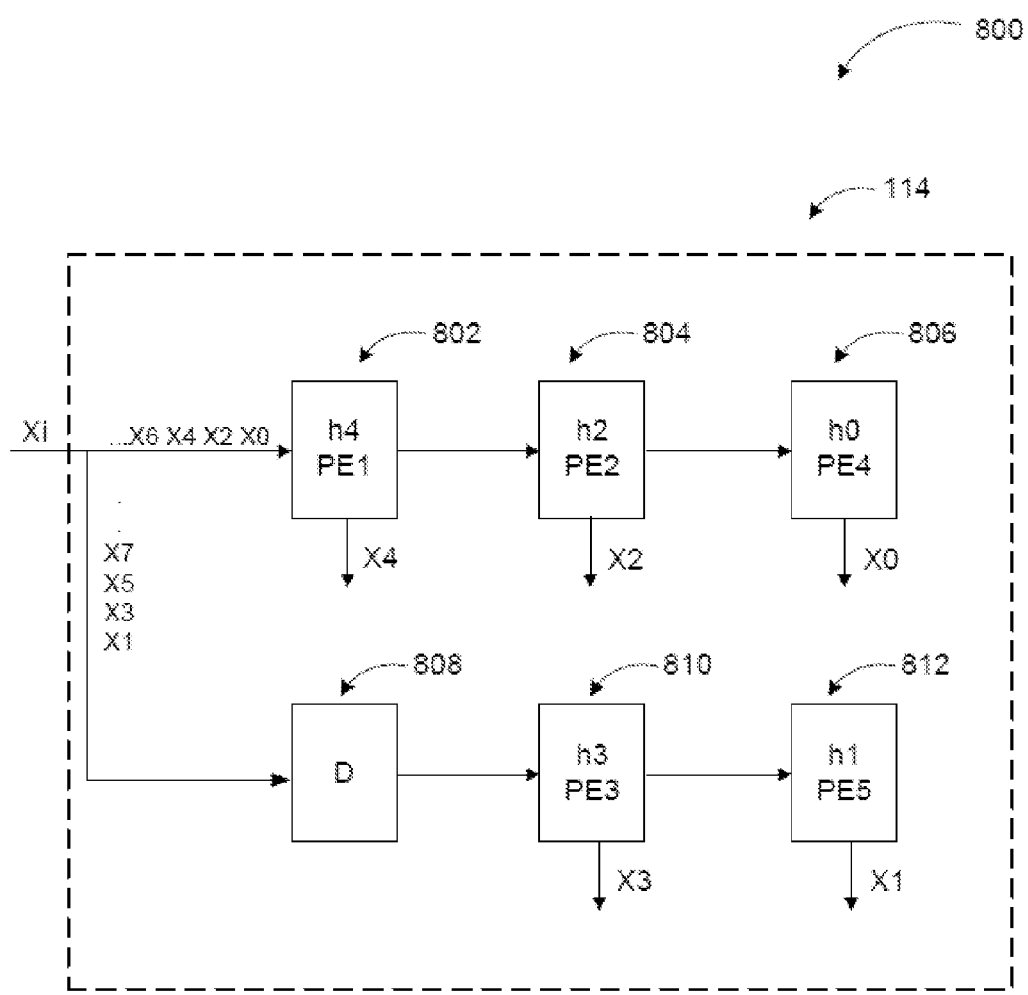
FIG. 8 illustrates an example architecture of a low-pass filter stage of a Mallat transform circuit for a 6-cycle computation of the coefficients.

FIG. 8 illustrates example architecture of a low-pass filter stage of a Mallat transform circuit for a 6-cycle computation of the coefficients.

The architecture shown in diagram 800 illustrates input samples being separated as odd and even input samples (X1, X3, X5, etc. and X0, X2, X4, etc.). Odd samples are provided to the top processing elements 802, 804, and 806 for low-pass filter coefficients h0, h2, and h4 computations. Even samples are provided to the bottom two processing elements 810 and 812 for low-pass filter coefficients h1 and h3 after a delay element 808. A more detailed view of the computation process in each processing element for low-pass filtering is shown below in conjunction with FIG. 15.

Figure 9:
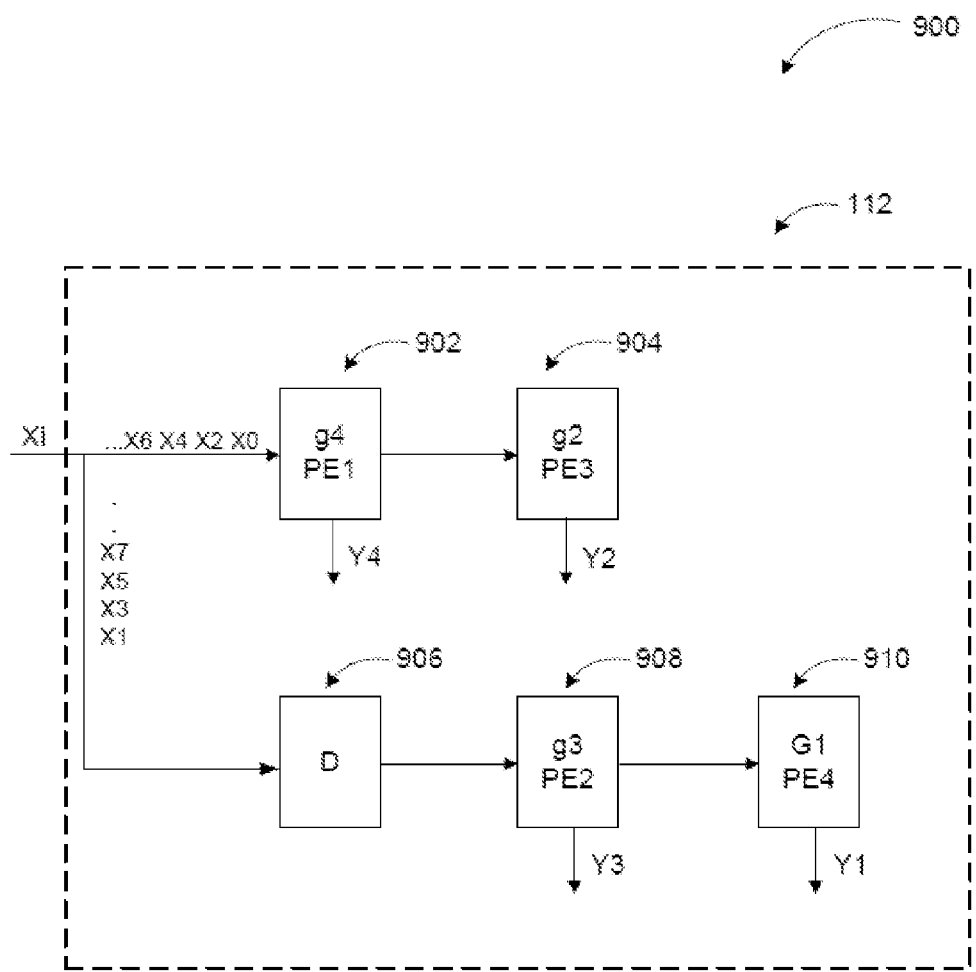
FIG. 9 illustrates an example architecture of a high-pass filter stage of a Mallat transform circuit for a 6-cycle computation of the coefficients.
Figure 10A:
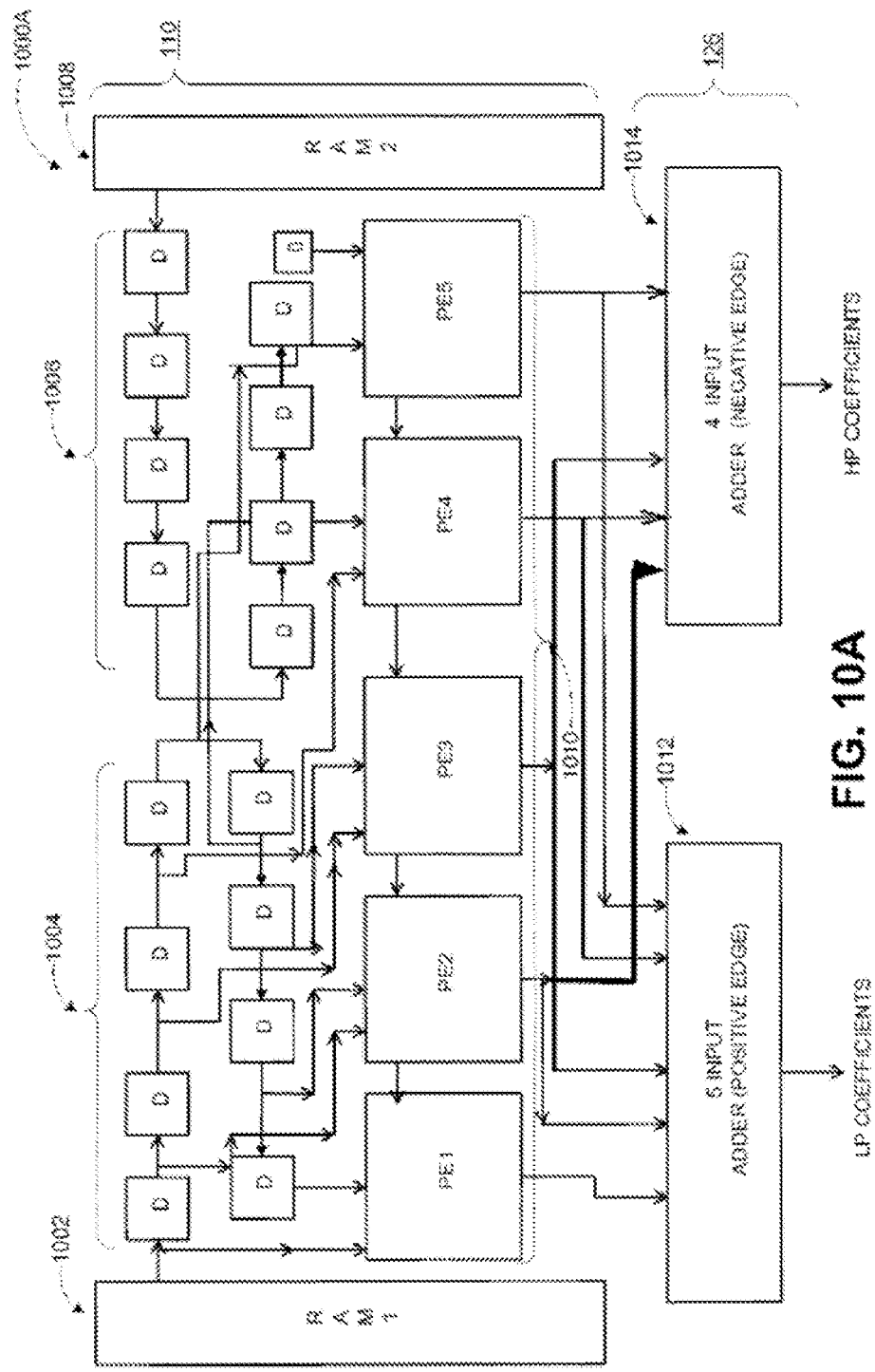
FIG. 10A through 10D illustrate example Random Access Memory (RAM) structure for a low-pass and high-pass Mallat transform circuits with positive edge and negative edge configurations according to some embodiments.
Figure 10B:
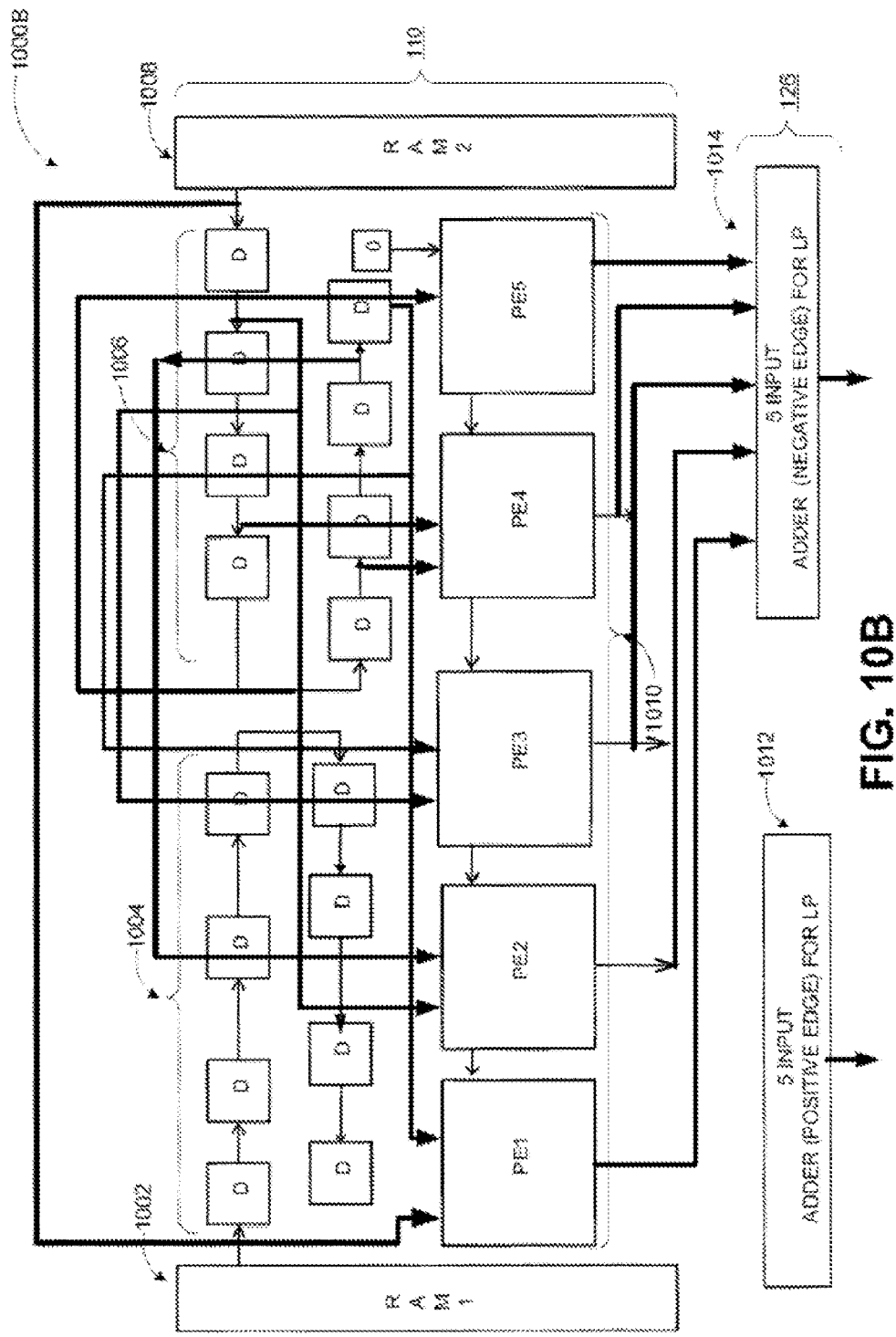
Figure 10C:
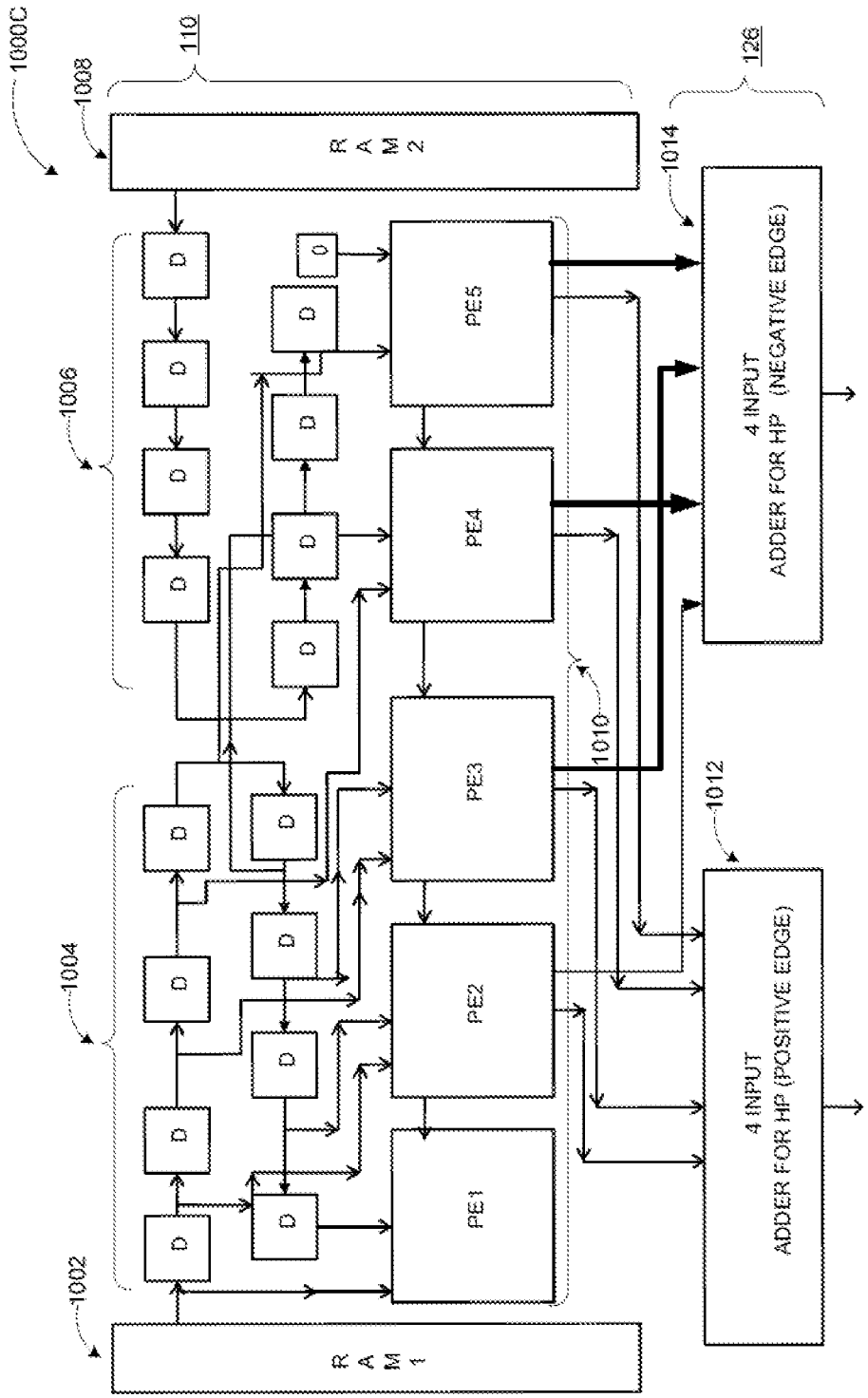
Figure 10D:
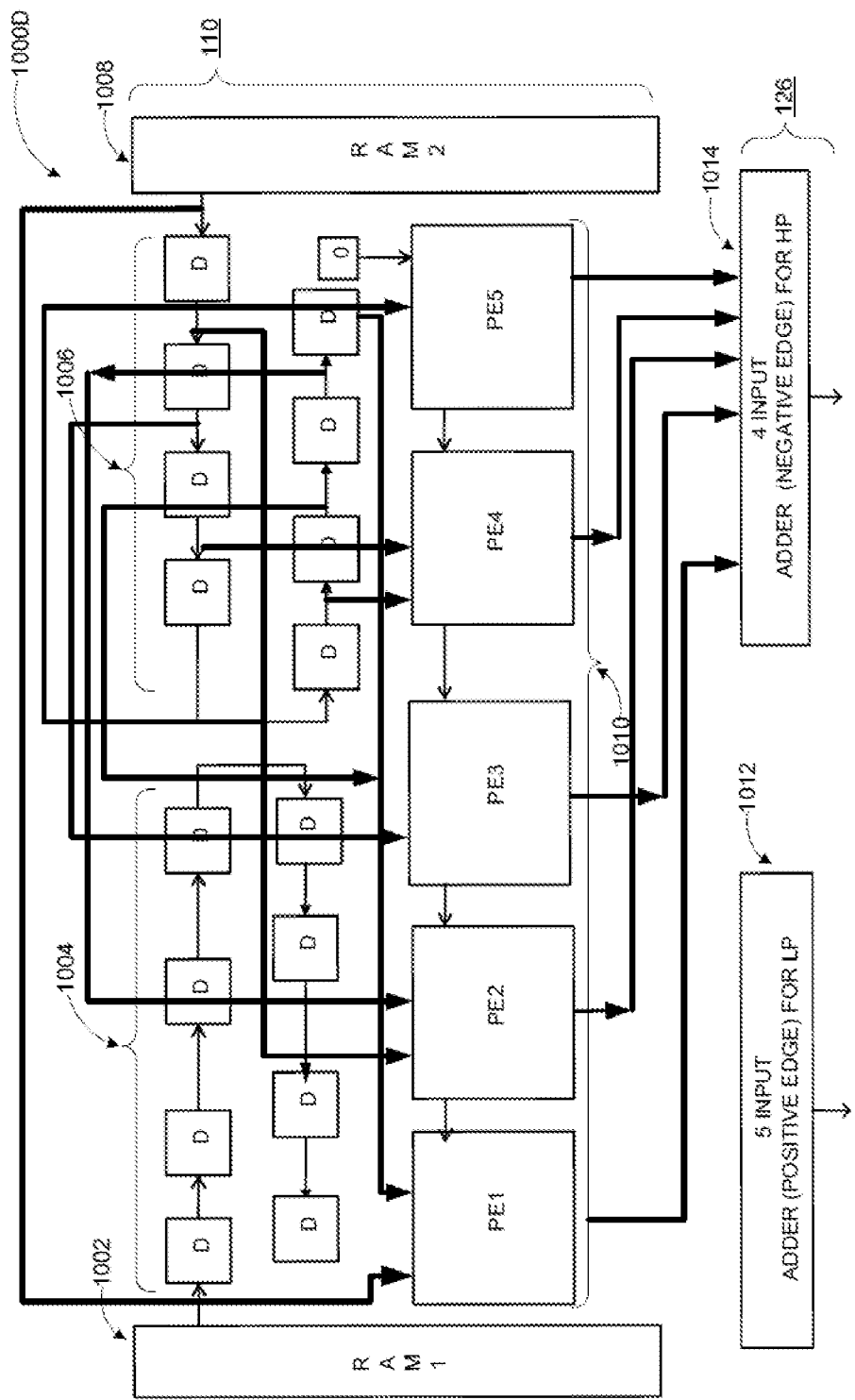

FIG. 9 illustrates example architecture of a high-pass filter stage of a Mallat transform circuit for a 6-cycle computation of the coefficients.

The architecture shown in diagram 900 illustrates input samples for high-pass operations also being separated as odd and even input samples (X1, X3, X5, etc. and X0, X2, X4, etc.). Odd samples are provided to the top processing elements 902 and 904 for high-pass filter coefficients g2 and g4 computations. Even samples are provided to the bottom two processing elements 908 and 910 for high-pass filter coefficients g1 and g3 after a delay element 906. An example of a more detailed view of the computation process in each processing element for high-pass filtering is shown below in conjunction with FIG. 16.

FIG. 10A through 10D illustrate example Random Access Memory (RAM) structure for a low-pass and high-pass Mallat transform circuits with positive edge and negative edge configurations according to some embodiments.

The architecture shown in diagram 1000A for performing DWT may utilize a configuration of two data storage elements (e.g., RAMs 1002 and 1008). This arrangement allows two different data streams to undergo wavelet transformations with the data flow alternating in direction (between RAMs 1002 and 1008) from one iteration to the other. According to some embodiments, a bi-orthogonal 9:7 spline filter may be used. The resulting models may be mapped to an array of m cores with a cache as shown in diagram 1000A. The first structure or the low-pass structure for the DWT may be expressed in terms of the following equations.

$$a_k = \sum_{k=0}^{N-1} h_{2n-k} x_k \text{ and} \quad [8]$$

$$c_k = \sum_{k=0}^{N-1} g_{2n-k} x_k. \quad [9]$$

Odd and even samples may be fed into an array of processing elements 1010 from RAMs (1002, 1008) in an alternating manner at each iteration, where one RAM is used in odd cycles and the other RAM is used in even cycles. The two RAMs may be fed with input data from a structure of multiple arrival channels and a plurality of circular buffers (not shown) each feeding a group of RAMs arranged for the caching operation. Each processor core may include two or more RAMs (e.g. 1002, 1008). For one stage of Mallat the same core may be used in multiple forward and backward steps. One example forward step may constitute one pass through Mallat high-pass filter, low-pass filter and decimation operations. In an example case of N=8 (8 input samples), the equations for the low-pass structure of the DWT may be expanded as:

$$a_0 = h_0 x_0 + h_{-1} x_1 + h_{-2} x_2 + h_{-3} x_3 + h_{-4} x_4$$

$$a_1 = h_2 x_0 + h_1 x_1 + h_0 x_2 + h_{-1} x_3 + h_{-2} x_4 + h_{-3} x_5 + h_{-4} x_6$$

$$a_2 = h_4 x_0 + h_3 x_1 + h_2 x_2 + h_1 h_3 + h_0 h_4 + h_{-1} x_5 + h_{-2} x_6 + h_{-3} x_7$$

$$a_3 = 0 x_0 + 0 x_1 + h_4 x_2 + h_3 h_3 + h_2 x_4 + h_1 x_5 + h_0 x_6 + h_{-1} x_7$$

$$a_4 = 0 x_0 + 0 x_1 + 0 x_2 + 0 x_3 + h_4 x_4 + h_3 x_5 + h_2 x_6 + h_1 x_7$$

$$a_5 = h_2 x_0 + h_1 x_1 + h_0 x_2 + h_{-1} x_3 + h_{-2} x_4 + h_{-3} x_5$$

$$a_6 = h_4 x_0 + h_3 x_1 + h_2 x_2 + h_1 x_3 + h_0 x_4 + h_{-1} x_5 + h_{-2} x_6 + h_{-3} x_7$$

$$a_7 = h_4 x_2 + h_3 x_3 + h_2 x_4 + h_1 x_3 + h_1 x_5 + h_0 x_6 + h_{-1} x_7 \quad [10]$$

The high pass wavelet filter can be written in the form of the eight equations noted above as equation group [10]. The index i for each of the terms $h_i$ is identified with a different time, where the relative time delays between terms $h_i$ and $h_{i-1}$ may be provided by delay elements. For example, the time delays between the terms h0 through h7 may be provided by delay lines 1004 (positive edge) and 1006 (negative edge). The two delay lines are fed concurrently by two different RAMs. For example, term h1 may correspond to 2 time delays, term h2 may correspond to 4 time delays, term h3 may correspond to 6 delays, and term h4 may correspond to 8 time delays. As a result, the 8th delayed term may correspond to an input to the h4 block and the 6th delayed term may correspond to an input to the h3 block.

The equations for the high-pass Mallat filter may also be expressed as:

$$c_0 = g_0 x_0 + g_{-1} x_1 + g_{-2} x_2$$

$$c_1 = g_2 x_0 + g_1 x_1 + g_0 x_2 + g_{-1} x_3 + g_{-2} x_4$$

$$c_2 = g_4 x_0 + g_3 x_1 + g_2 x_2 + g_1 x_3 + g_0 x_4 + g_{-1} x_5 + g_{-2} x_6$$

$$c_3 = g_4 x_2 + g_3 x_3 + g_2 x_4 + g_1 x_5 + g_0 x_6 + g_{-1} x_7$$

$$c_4 = g_4 x_4 + g_3 x_5 + g_2 x_6 + g_1 x_7$$

$$c_5 = g_2 x_0 + g_1 x_1 + g_0 x_2 + g_{-1} x_3 + g_{-2} x_4 + g_{-3} x_5 c_6 = g_4 x_0 + g_3 x_1 + g_2 x_2 + g_1 x_3 + g_0 x_4 + g_{-1} x_5 + g_{-2} x_6$$

$$c_7 = g_4 x_2 + g_3 x_3 + g_2 x_4 + g_1 x_5 + g_0 x_6 + g_{-1} x_7 \quad [11]$$

The symmetry of the a0 coefficients may be used in a counterflow principle to create the structure below. An examination of the equations [10] and [11] of high-pass and low-pass sub-band samples a0 and c0 reveals that unlike a standard systolic structure, where the coefficients do not change, input samples are shifted left to right and output samples are shifted right to left. The number of equations may become simplified if coefficients and results are shifted and samples are all concurrently loaded. This property may be taken advantage of in writing the low-pass filter coefficients as:

$$a_0 = h_0(0+x_0) + h_1(0+x_1) + h_2)0+x_2) + h_3(0+x_3) + h_4(0+x_4)$$

$$a_1 = h_0(0+x_2) + h_1(x_1+x_3) + h_2(x_0+x_4) + h_3(0+x_5) + h_4(0+x_6)$$

$$a_2 = h_0(0+x_4) + h_1(x_3+x_5) + h_2(x_2+x_6) + h_3(x_1+x_7) + h_4(x_0+x_8) \quad [12]$$

The corresponding equations for the high-pass filter may be written as:

$$c_0 = g_1(0+0) + g_2(0+x_0) + g_3(0+x_3) + g_4(0+x_2)$$

$$c_1 = g_1(0+x_1) + g_2(x_0+x_2) + g_3(0+x_5) + h_4(0+x_4)$$

$$c_2 = g_1(0+x_3) + g_2(x_2+x_4) + g_3(x_1+x_5) + g_4(x_0+x_6) \quad [13]$$

The architecture utilizes two RAMs 1002, 1008, where the left RAM may be configured to retain the input samples. The expanded form of the Mallat low-pass equations may then follow a pattern set as follows:

$$a_0 = h_0(0+x_0) + h_1(0+x_1) + h_2(0+x_2) + h_3(0+x_3) + h_4(0+x_4)$$

$$a_1 = h_0(0+x_2) + h_1(x_1+x_3) + h_2(x_0+x_4) + h_3(0+x_5) + h_4(0+x_6)$$

$$a_2 = h_0(0+x_4) + h_1(x_3+x_5) + h_2(x_2+x_6) + h_3(x_1+x_7) + h_4(x_0+x_8)$$

$$a_3 = h_0(0+x_6) + h_1(x_5+x_7) + h_2(x_4+x_8) + h_3(x_3+x_9) + h_4(x_2+x_{10})$$

$$a_4 = h_0(0+x_8) + h_1(x_7+x_9) + h_2(x_6+x_{10}) + h_3(x_5+x_{11}) + h_4(x_4+x_{12}) \quad [14]$$

The above pattern of equation group [14] may be implemented with a structure that can access two RAMs. One group of data words may be processed so that the first wavelet output a0 is written at a first clock cycle and every second clock cycle thereafter.

The outputs of the low-pass/high-pass operations from the processing elements 1010 may be coupled to two 5-input tree adders 1012 and 1014. By using one adder for outputs available at the positive edge (1012) and another adder to process the processing element outputs available at the negative edge (1014), the rate at which data is available may be effectively doubled. The output data may be written to an external output buffer according to some embodiments or it may be written to the other RAM (different from the input RAM) according to other embodiments.

Diagrams 1000A through 1000D show dual RAMs 1002 and 1008, which feed two delay lines one being operated at positive clock edges and another line being operated at negative clock edges. The detailed connections of the delay lines, RAMs, and processing elements in diagram 1000A, 1000B, 1000C, and 1000D correspond to low-pass positive edge, low-pass negative edge, high-pass positive edge, and high-pass negative edge configurations, respectively. The Processing elements PE1 through PE5 (1010) perform their operations on both positive and negative edges as they have two independent multiply-add pipelines one of which operates on the positive edge and the other on the negative edge as discussed below in conjunction with FIGS. 11 and 12.

Figure 11:
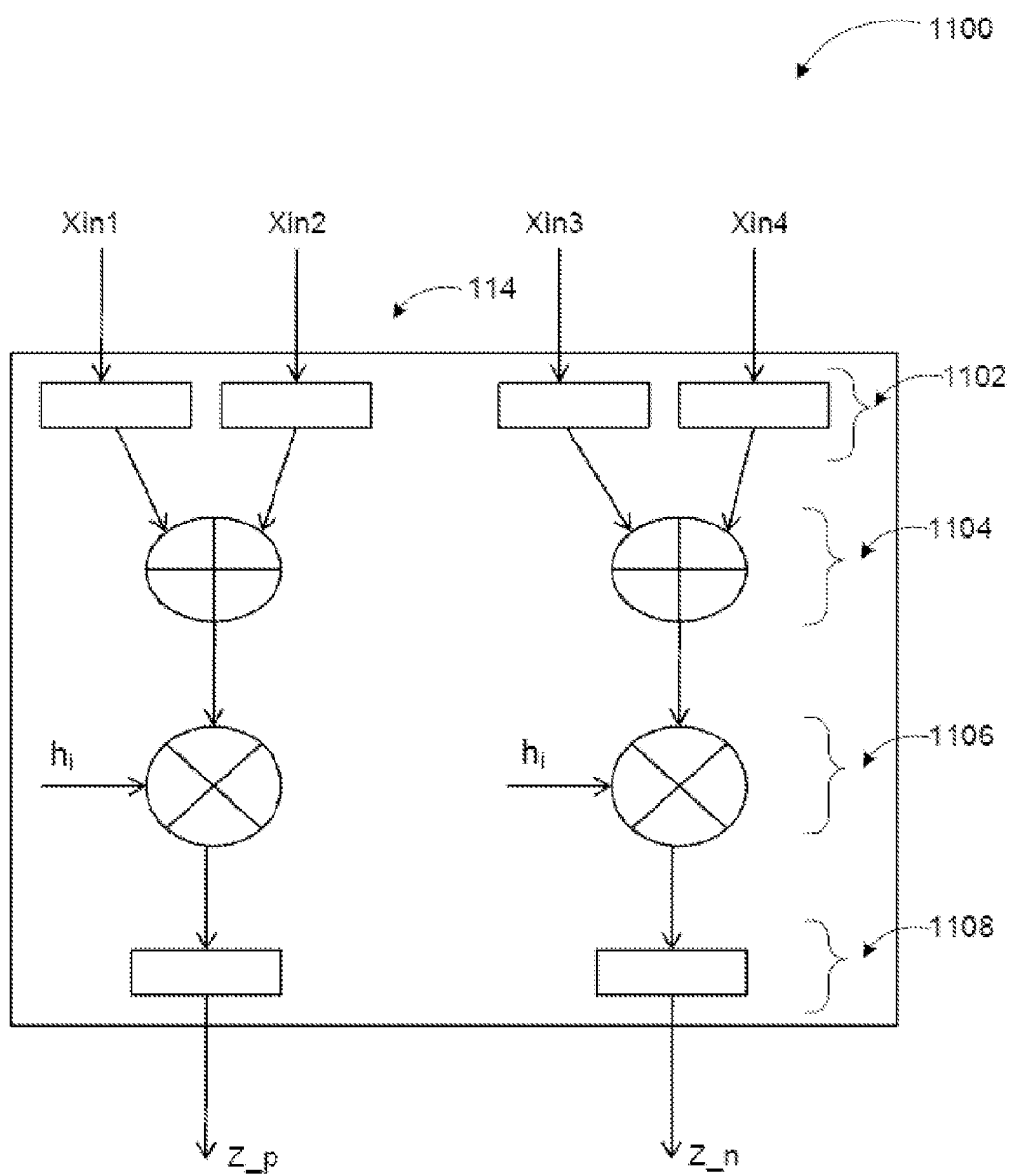
FIG. 11 illustrates an example processing element for a low-pass component of the RAM structure of FIG. 10.

FIG. 11 illustrates an example processing element for a low-pass component of the RAM structure of FIG. 10 in accordance with at least some embodiments.

In an example systolic array as illustrated above, each processing element may include four 2-stage pipelines. Of the four pipelines, two may be dedicated to low-pass coefficient computation operations and the other two may be dedicated to high pass coefficient computation operations. Diagram 1100 shows example two stages dedicated to low-pass coefficient computations, where the input values may be buffered (1102), subjected to addition and shift operations (1104), and multiplication operations (1106). An output buffer (or register) stage 1108 may be configured to provide the outputs (Z_p and Z_n) to corresponding adders.

The two pipelines for the low-pass computation may be adapted for concurrent operation, with the left hand side pipeline being selectively coupled at the positive edge of a clock signal and the right hand side pipeline being selectively coupled at the negative edge of the clock signal.

Figure 12:
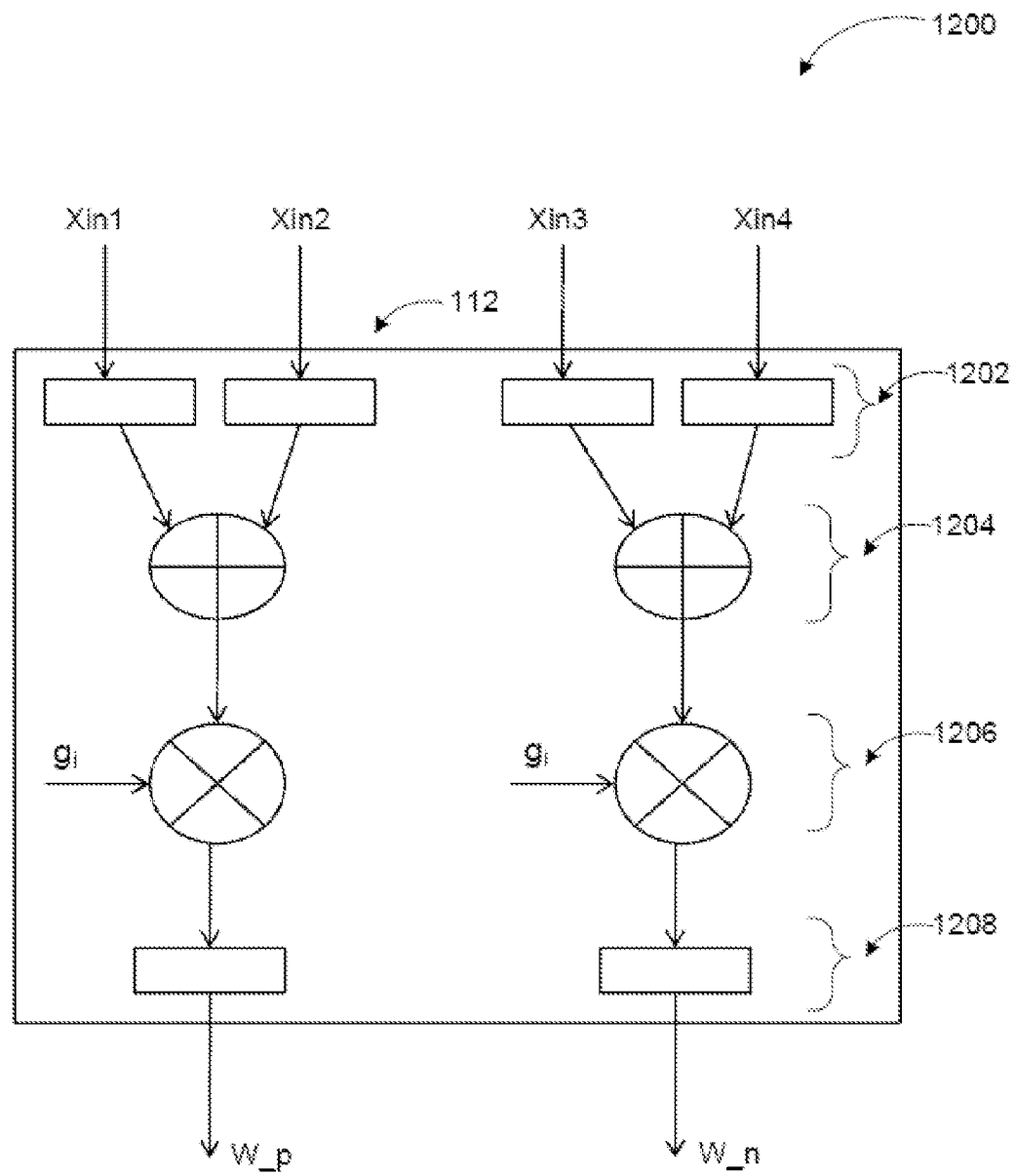
FIG. 12 illustrates an example processing element for a high-pass component of the RAM structure of FIG. 10.

FIG. 12 illustrates an example processing element for a high-pass component of the RAM structure of FIG. 10. Diagram 1200 shows example two stages dedicated to high-pass coefficient computation operations, which are similar to the pipelines of FIG. 11. The input values may be buffered (1202), subjected to addition and shift operations (1204), and multiplication operations (1206). An output buffer (or register) stage 1208 may configured to provide the outputs (W_p and W_n) to corresponding high-pass output adders.

The two pipelines for the high-pass computation may also be adapted for concurrent operation, with the left hand side pipeline being selectively coupled at the positive edge of a clock signal and the right hand side pipeline being selectively coupled at the negative edge of the clock signal.

The outputs W_p and W_n in diagram 1200 represent the components of the high-pass filter coefficients before they are added in the 4-input adder. The outputs Z_p and Z_n in diagram 1100 of FIG. 11 represent the low-pass filter coefficients before they are added in the 5-input adder. According to some embodiments, W_p is sent to a 4-input adder, which operates only on the positive edge of the clock and forms the Mallat coefficients for the data originating in the left hand side RAM 1002 of FIGS. 10A through 10D. W_n is sent to the adder operating on the negative edge in FIG. 10D. Each processing element has 4 output ports—2 for low-pass filter coefficients (positive edge and negative edge) and 2 for high-pass filter coefficients (positive edge and negative edge). The outputs of the adders may be sent to two sets of decimators as shown in FIG. 1. One set of decimators (positive edge and negative edge) for low-pass filter coefficients and the other set of decimators (positive edge and negative edge) for high-pass filter coefficients.

Figure 13:
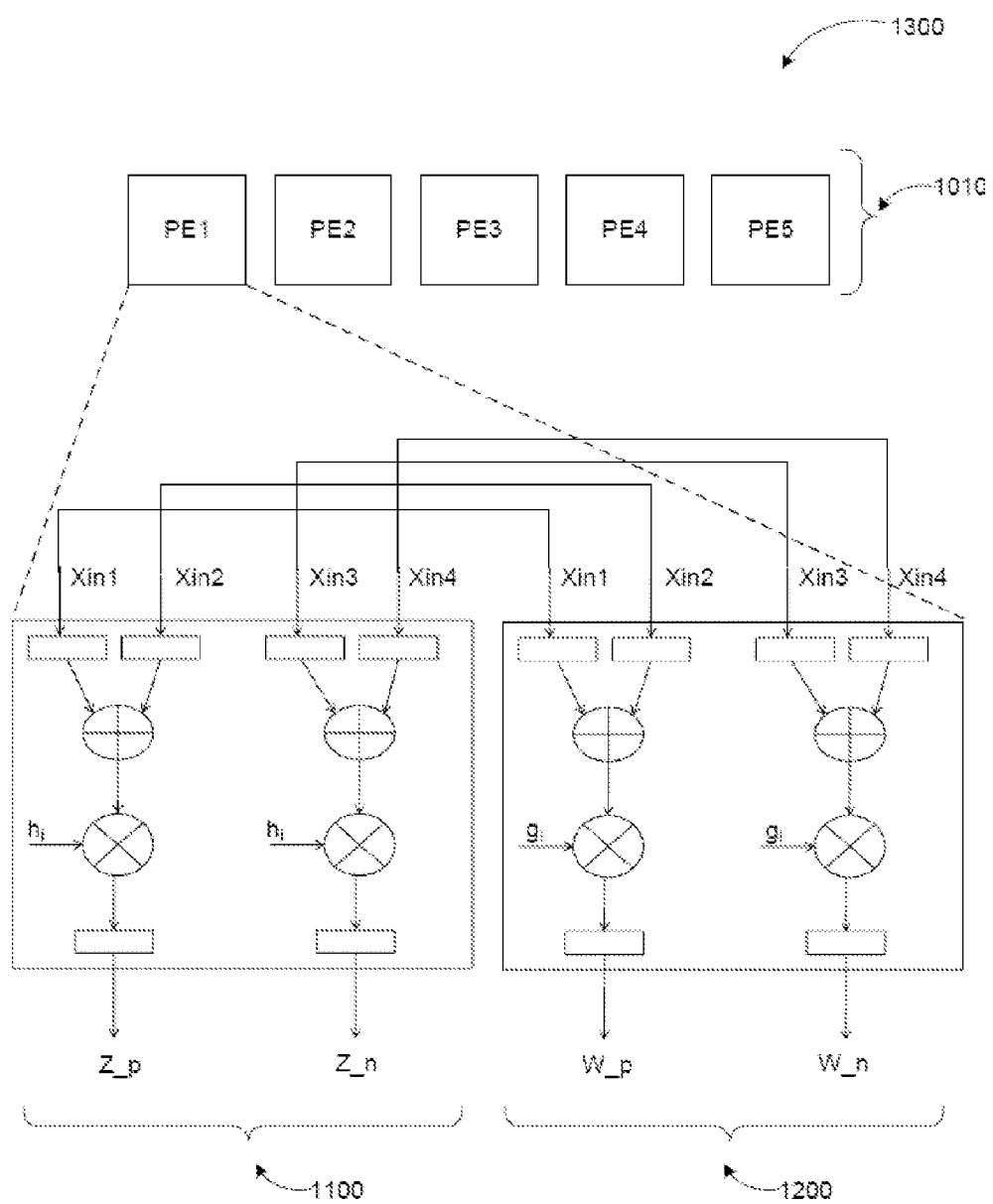
FIG. 13 illustrates an example arrangement for low-pass and high-pass Mallat coefficients for each processing element of FIG. 10.

FIG. 13 illustrates an example arrangement for low-pass and high-pass Mallat coefficients for each processing element of FIG. 10.

Each of the processing elements (PEs) 1010 in diagram 1300 may be configured to receive and concurrently process the input values Xi in two sets of pipelines, one pipeline for low-pass filter operations, and one pipeline for high-pass filter operations. The output data may be processed through tree adders and stored in an output buffer or RAM. The output data rate may may be effectively doubled by using positive and negative edge of the clock signal processing, According to some embodiments, a first data stream may be received by the processing elements 1010 at the positive edge of every clock cycle from a first buffer (or RAM). A second data stream may be received from a second buffer or RAM at the negative edge of every clock cycle doubling the rate at which the dual arrangement processing elements are filled. The pipelines 1100 and 1200 of each processing element may be configured to operate at both the positive edge and negative edge of the clock cycle such that the data streams processed at each corresponding clock edge are different. Due to the operation at both edges, an intra-sample delay may be effectively halved. The PE elements 1010 are fed by both the delay lines so they have 4 input ports with one pair corresponding to the positive clock edge and the other pair corresponding to the negative clock edge. Each PE element has four outputs one for positive edge and the other for negative edge of each of the low-pass and high-pass signals. The positive edge summation for low-pass filtering requires 5 PEs and the positive edge summation for high-pass filtering requires 4 PEs.

Figure 14:
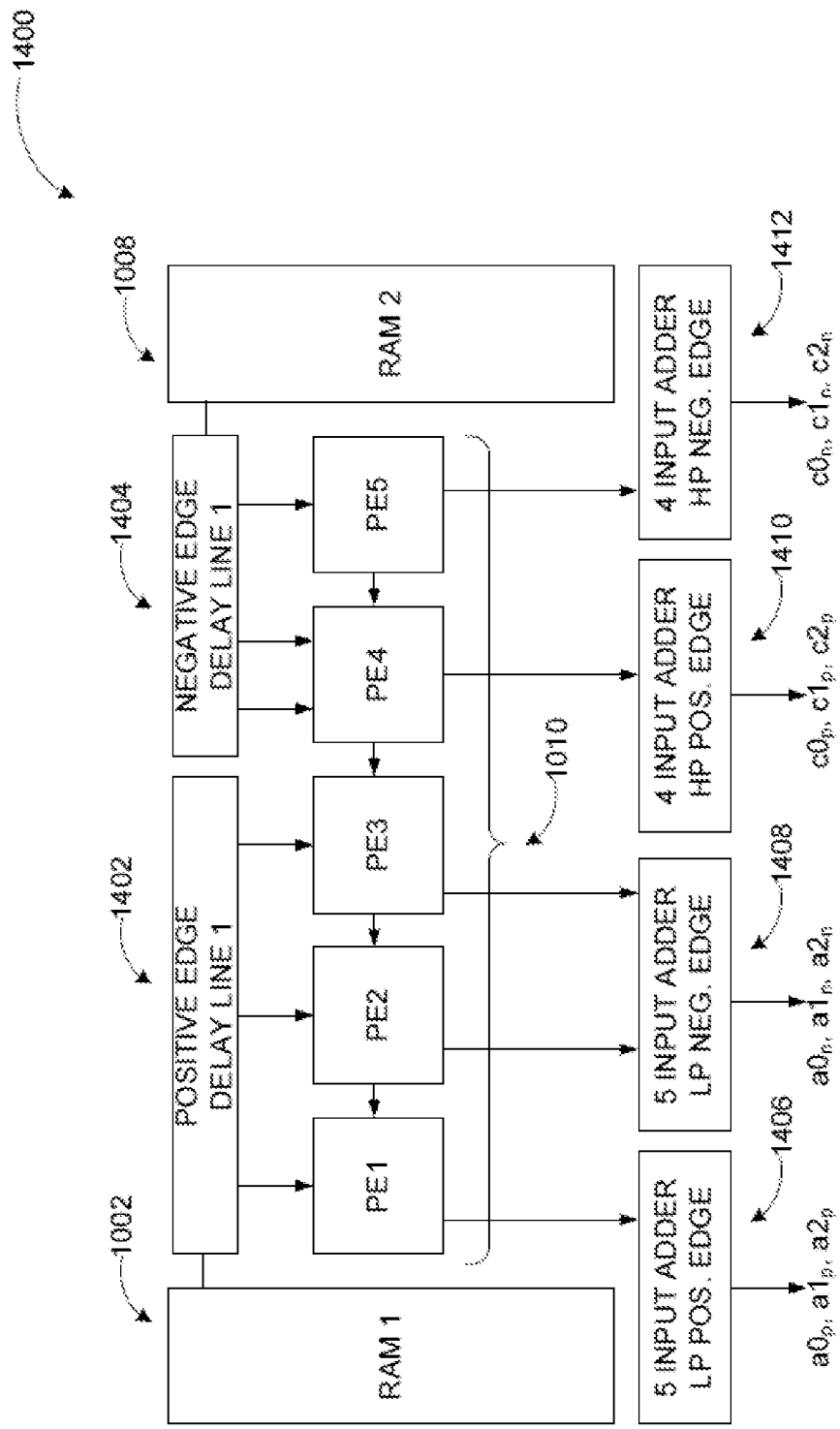
FIG. 14 illustrates another example RAM structure for a low-pass and high-pass Mallat transform circuit according to other embodiments.

FIG. 14 illustrates another example RAM structure for a low-pass and high-pass Mallat transform circuit according to other embodiments. Diagram 1400 is a more abstract view of the configurations of FIGS. 10A through 10D. The two RAMs 1002 and 1008 are placed proximate to the two delay lines. One of the delay lines 1402 (also represented in FIGS. 10A through 10D as 1004) performs shifting only on positive clock edges. The second delay line 1404 (also represented in FIGS. 10A through 10D as 1006) performs shifting on negative clock edges. The 5 processing elements 1010 (PE1 through PE5) are fed by the two delay lines 1402 and 1404. The PE elements 1010 feed two 5-input adders for the low-pass filter coefficients and two 4-input adders for the high-pass filter coefficients. The two RAMs 1002 and 1008 may be located on the same layer of silicon as the delay lines and processing elements in a three dimensional integrated circuit. They may also be located on different layers of silicon relative to the delay lines and the processing elements of a three dimensional integrated circuit.

Diagram 1400 illustrates another arrangement of two RAMs 1002 and 1008, five processing elements 1010, two delay lines 1402 and 1404 each with eight delays, and two sets of adders 1406, 1408, 1410, and 1412. The delay lines may be dedicated for operation with inputs at either a positive edge of a clock signal (1402) or a negative edge of the clock signal (1404). Similarly, the adders may also be dedicated for operation with either the positive edge or the negative edge of the clock signal. For example, one 5-input adder (1406) for low-pass sub-band sample outputs may be configured for operation on the positive edge of the clock signal, another 5-input adder (1408) for low-pass sub-band sample outputs may be configured for operation on the negative edge of the clock signal, one 4-input adder (1410) for high-pass sub-band sample outputs may be configured for operation on the positive edge of the signal, and one 4-input adder (1412) for high-pass sub-band sample outputs may be configured for operation on the negative edge of the signal.

In the outputs of adders 1406, 1408, 1410, 1412 four independent sets of sub-band samples are available. Low-pass sub-band samples outputted with the positive clock edge a0p, a1p, a2p . . . Low-pass sub-band samples outputted with the negative clock edge a0n, a1n, a2n . . . High-pass sub-band samples outputted with the positive clock edge c0p, c1p, c2p . . . High-pass sub-band samples outputted with the negative clock edge c0n, c1n, c2n . . . According to some embodiments, the 5 inputs and 4 input adders may be configured to operate as tree adders to minimize a delay in operations.

Figure 15:
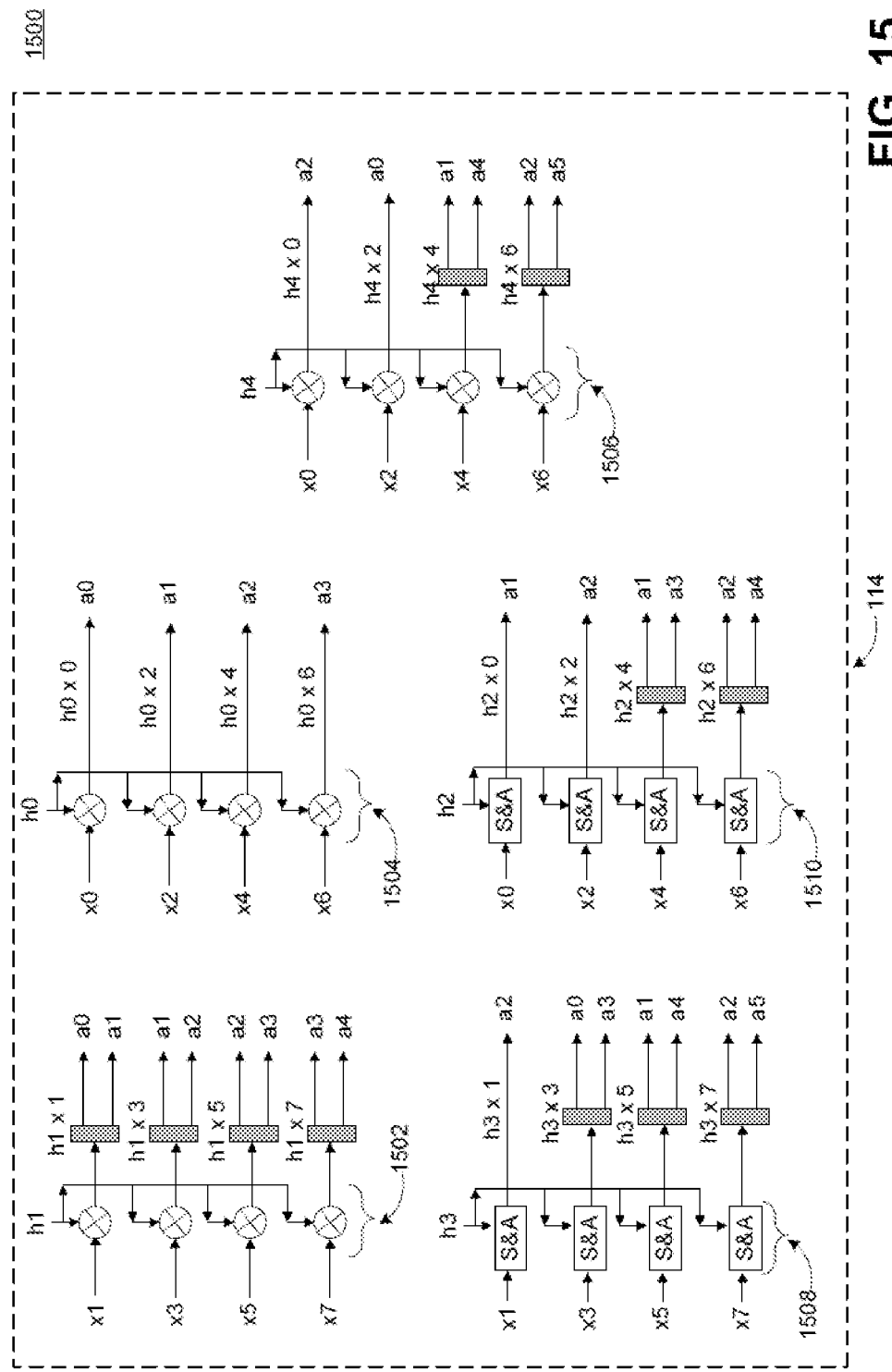
FIG. 15 illustrates an example product forming network for a low-pass Mallat transform circuit.

FIG. 15 illustrates an example product forming network for a low-pass Mallat transform circuit. As discussed previously in conjunction with FIG. 8, input samples may be divided into groups of odd samples and even samples. Odd samples may be processed as odd low-pass coefficient computation operations, while even samples may be processed as even low-pass coefficient computation operations.

As shown in diagram 1500, low-pass filter coefficients h1, h0, and h4 are utilized with regular signed multiplications 1502, 1504, 1506 (which may be reduced through common partial product elimination). As the secondary operation-reduction approach according to some embodiments, sub-band samples may also be computed through shift-and-add (S&A) operations 1508, 1510, with low-pass filter coefficients h2 and h3 as inputs instead of multiplications further reducing needed hardware, computation time, and power for the components.

Figure 16:
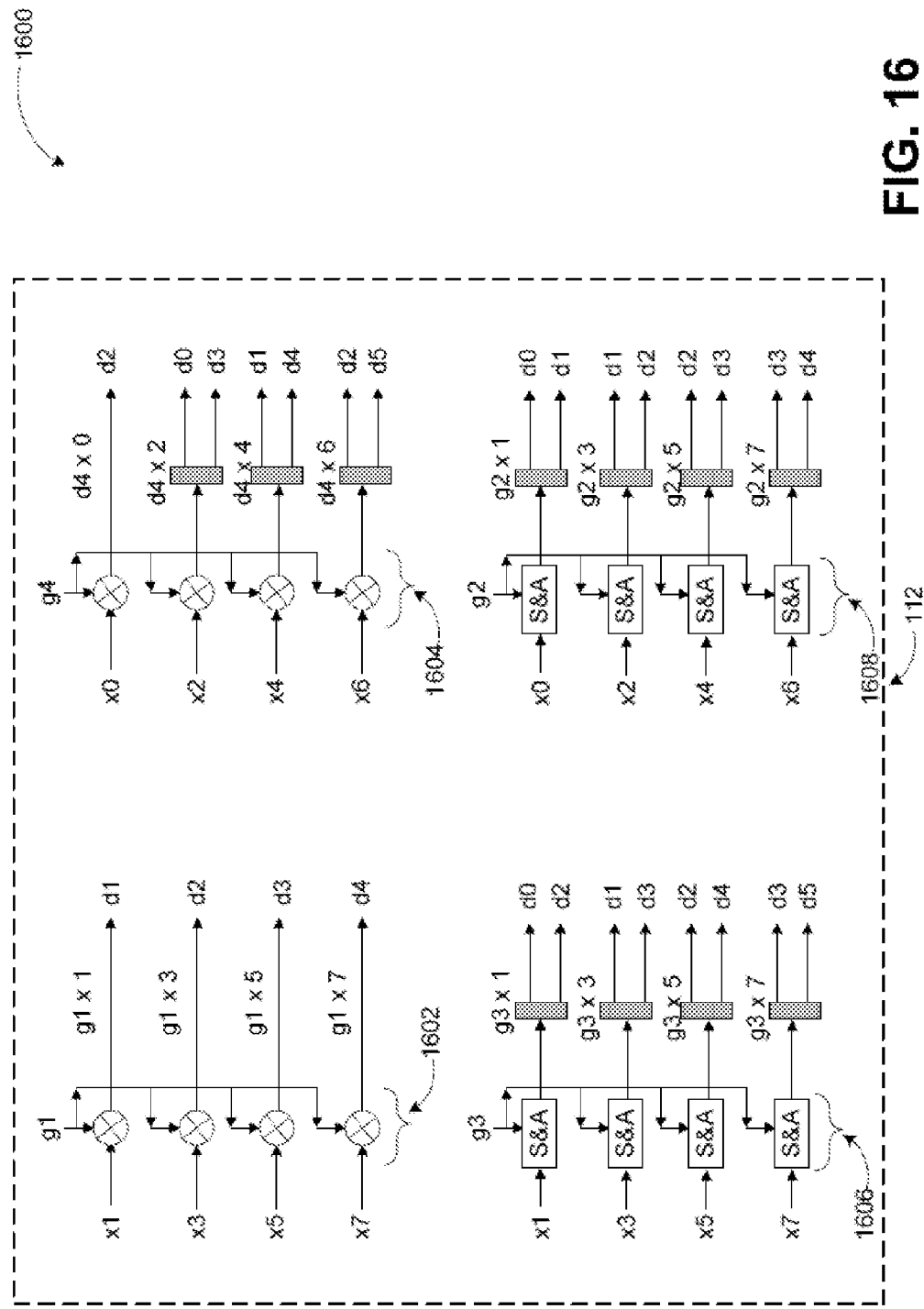
FIG. 16 illustrates an example product forming network for a high-pass Mallat transform circuit.

FIG. 16 illustrates an example product forming network for a high-pass Mallat transform circuit. The input samples x1-x7 may also be split between odd samples and even samples in the high-pass operations. Odd samples may be used in sub-band sample computations (d0-d5) with odd high-pass filter coefficients g1 and g3, while even samples may be used in sub-band sample computations with even high-pass filter coefficients g2 and g4.

As shown in diagram 1600, high-pass filter coefficients g1 and g4 include regular signed multiplications 1602 and 1604 (which may be reduced through common partial product elimination). As the secondary operation-reduction approach according to some embodiments, high-pass filter coefficients g2 and g3 may also be computed through shift-and-add operations 1606 and 1608, as opposed to multiplications further reducing needed hardware, computation time, and power for the components.

Figure 17:
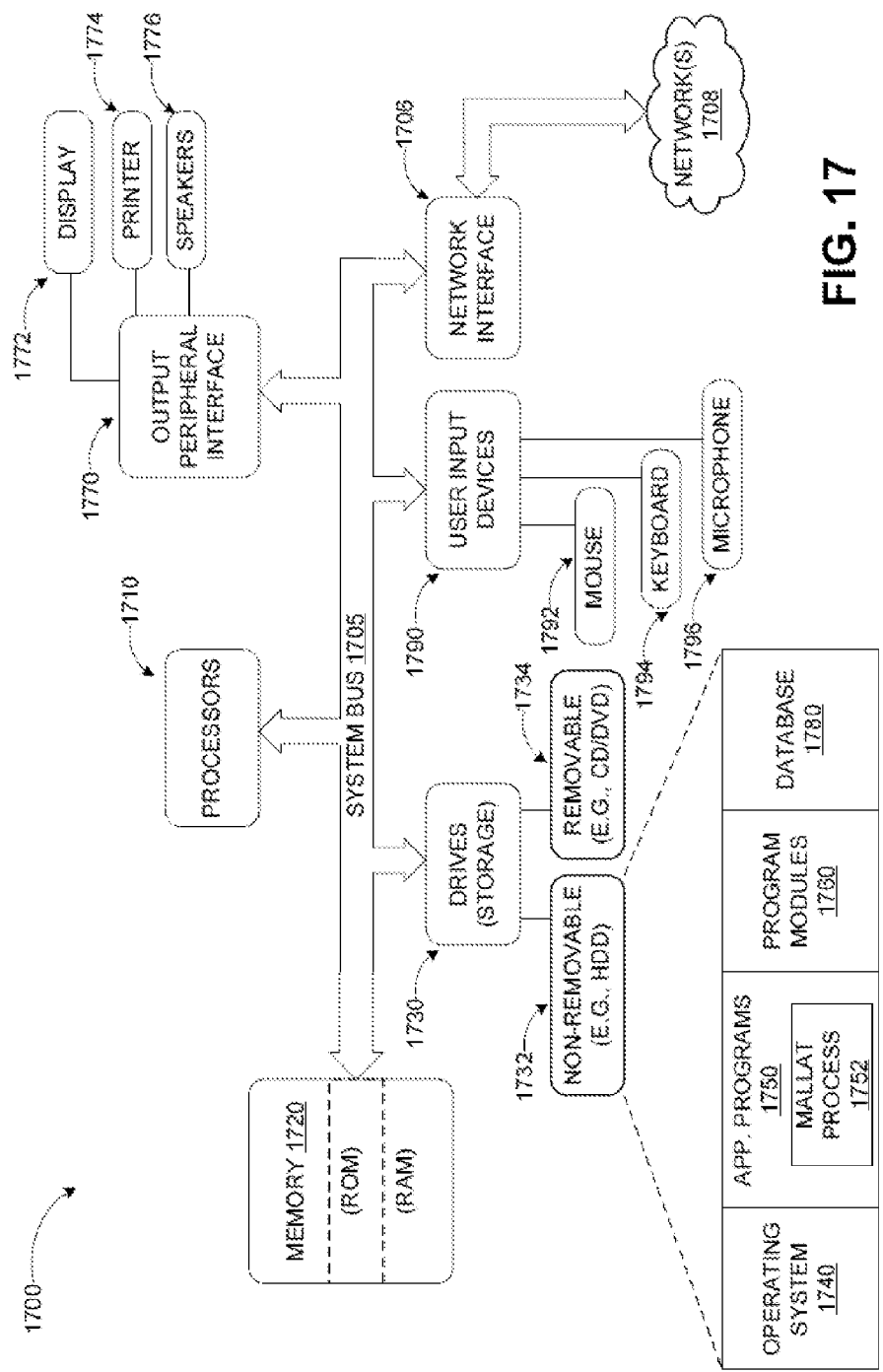
FIG. 17 illustrates a general purpose computing device, which may be used as an environment for wavelet transformation.

FIG. 17 illustrates a general purpose computing device, which may be used as a computation environment for wavelet transformation arranged in accordance with at least some embodiments of the present disclosure.

Computer 1700 includes a processor 1710, memory 1720, and one or more drives 1730. The drives 1730 and their associated computer storage media such as removable storage media 1734 (e.g., CD-ROM, DVD-ROM) and non-removable storage media 1732 (e.g. a hard drive disk), may provide storage of computer readable instructions, data structures, program modules and other data for the computer 1700. Drives 1730 may include an operating system 1740, application programs 1750, program modules 1760, and database 1780. Computer 1700 further may include user input devices 1790 through which a user may enter commands and data. Input devices 1790 may include an electronic digitizer, a microphone 1796, a keyboard 1794, and a pointing device such as a mouse device 1792, trackball device or touch pad device. Other input devices may include a joystick device, game pad device, satellite dish, scanner device, or the like.

Application programs 1750 may receive and process data associated with a set of pixels. A Mallat process module 1752 within application programs 1750 may compute wavelet coefficients by applying a series of Discrete Wavelet Transform (DWT) low-pass and high-pass filtering operations, and reduce a number of filtering operations by identifying common partial products for at least one of the low-pass filtering operations and the high-pass filtering operations and eliminating the common partial products. The DWT may then be applied based on remaining filtering operations.

The above described and other input devices may be coupled to processor 1710 through a user input interface that is coupled to a system bus 1705, but may be coupled by other interface and bus structures, such as a parallel port, game port or a universal serial bus (USB). Computers such as computer 1700 may also include other peripheral output devices such as speakers 1776, printer 1774, and display 1772, which may be coupled through an output peripheral interface 1770 or the like.

Memory 1720, removable storage devices 1734 and non-removable storage devices 1732 are examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which may be used to store the desired information and which may be accessed by computer 1700. Any such computer storage media may be part of computer 1700.

Computer 1700 may operate in a networked environment using logical connections to one or more computers, such as a remote computer connected to network interface 1706. The remote computer may be a personal computer, a server, a router, a network PC, a peer device or other common network node, and can include many or all of the elements described above relative to computer 1700. Networking environments are commonplace in offices, enterprise-wide area networks (WAN), local area networks (LAN), intranets and world-wide networks such as the Internet. For example, in the subject matter of the present application, computer 1700 may comprise the controller machine from which data is being migrated to multilayer circuit board manufacturing systems such as automatic drill systems, etching systems, etc., and the remote computer may comprise controllers of the systems. It should be noted, however, that source and destination machines need not be coupled together by a network(s) 1708 or any other means, but instead, data may be migrated via any media capable of being written by the source platform and read by the destination platform or platforms. When used in a LAN or WLAN networking environment, computer 1700 may be coupled to the LAN through network interface 1706 or an adapter.

The network(s) may comprise any topology employing servers, clients, switches, routers, modems, Internet service providers (ISPs), and any appropriate communication media (e.g., wired or wireless communications). A system according to some embodiments may have a static or dynamic network topology. The network(s) may include a secure network such as an enterprise network (e.g., a LAN, WAN, or WLAN), an unsecure network such as a wireless open network (e.g., IEEE 802.11 wireless networks), or a world-wide network such (e.g., the Internet). The network(s) may also comprise a plurality of distinct networks that are adapted to operate together. The network(s) are adapted to provide communication between the nodes described herein. By way of example, and not limitation, the network(s) may include wireless media such as acoustic, RF, infrared and other wireless media.

The network communication link may be one example of a communication media. Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

Computer 1700 may be implemented as a portion of a small-form factor portable (or mobile) electronic device such as a portable computing device, a mobile computing device, an application specific device, or a hybrid device that include any of the above functions. Computer 1700 may also be implemented as a personal computer including both laptop computer and non-laptop computer configurations. Moreover, computer 1700 may be implemented as a networked system or as part of a general purpose or specialized server.

Figure 18:
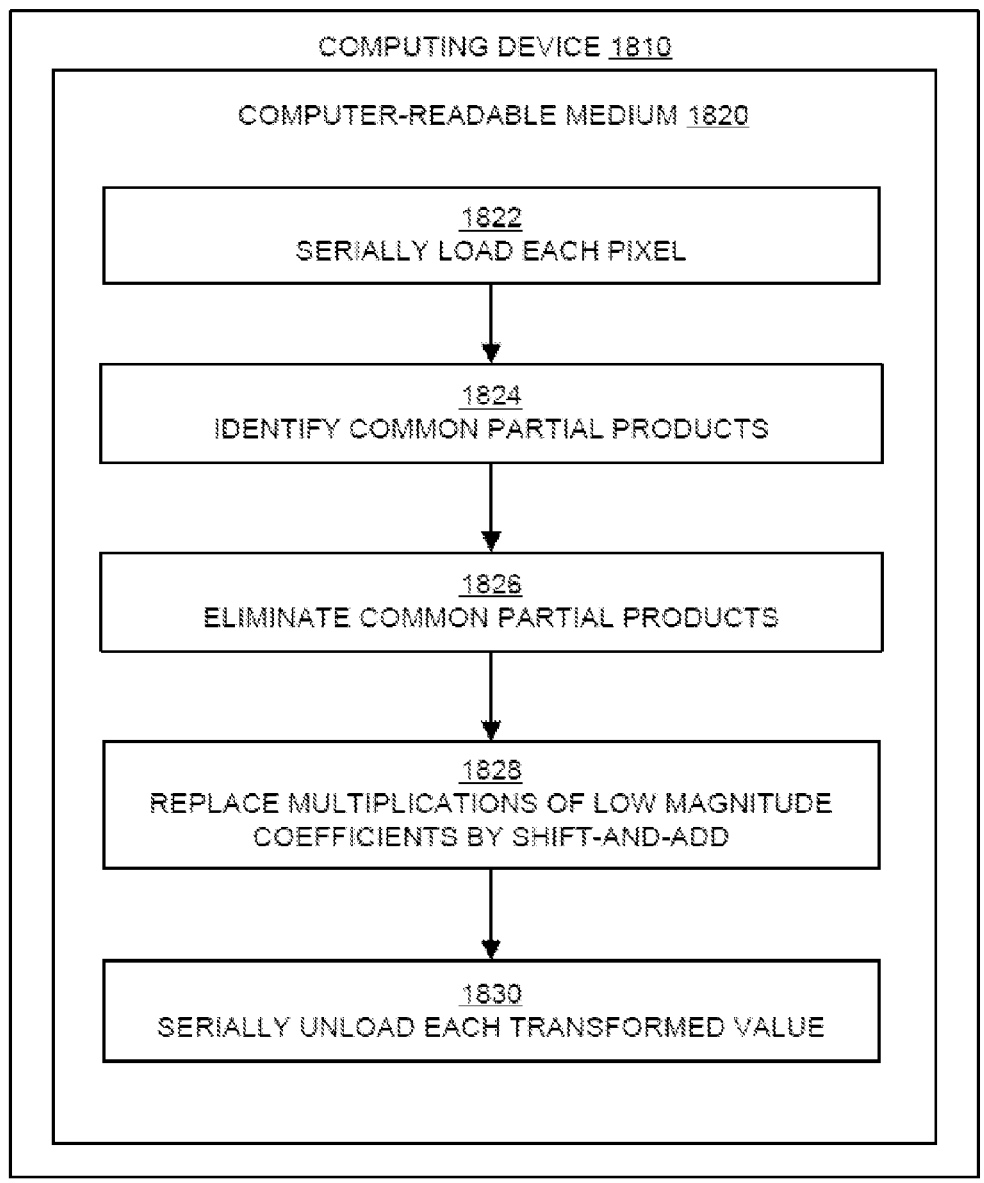
FIG. 18 is a flow diagram illustrating an example method that may be performed by a computing device, such as computing device 1700 in FIG. 17.

FIG. 18 is a flow diagram illustrating an example method that may be performed by a computing device, such as computing device 1700 in FIG. 17. The operations described in blocks 1822 through 1832 may be stored as computer-executable instructions in a computer-readable medium such as drives 1730 of computer 1700 or memory of processor 1710. One or more processors (e.g., 1710) in a multi-core processor may be configured to perform one or more of the operations described below.

A process of computing wavelet transformation may begin with operation 1822, "SERIALLY LOAD EACH PIXEL." At operation 1822, input values may be loaded into a SIPO component such as the SIPO component 104 of FIG. 1, which can be utilized as the serial data to the processing elements of a Mallat processor 110. Operation 1822 may be followed by operation 1824, "IDENTIFY COMMON PARTIAL PRODUCTS". At operation 1824, common partial products in the equations of low-pass and high-pass coefficient matrices may be identified. Operation 1824 may be followed by operation 1826, "ELIMINATE COMMON PARTIAL PRODUCTS," where the partial products identified previously at operation 1824 may be eliminated from the computation. By eliminating the common partial products, fewer operations need to be performed by the processing elements 1010 of FIG. 10, which means the processing elements may be implemented with fewer components and thereby may consume less power. A computation time may also be reduced due to the reduction in operations.

Operation 1826 may be followed by operation 1828, "REPLACE MULTIPLICATIONS OF LOW MAGNITUDE COEFFICIENTS BY SHIFT-AND-ADD." At operation 1828, low-pass and high-pass coefficients with lower magnitudes such as h2, h3, or g3 may be computed using shift and add type operations (e.g. 1606, 1608 of FIG. 16) instead of regular multiplication operations. Possible errors introduced by this replacement may be negligibly small. On the other hand, a substantial number of multiplication operations and associated hardware required for multiplication operations may be spared, which may result in faster computation times and reduced power consumption.

Operation 1828 may be followed by operation 1830, "SERIALLY UNLOAD EACH TRANSFORMED VALUE" FOLLOWING OPERATION 1828. At operation 1830, the outputs of concurrently running processing operations (e.g., parallel operations in different processing cores of a multi-core processor) may be converted to a serial output by a series of tree-structured adders and a PISO component (e.g., adders 126 and PISO 124 of FIG. 1). The wrapper around the Mallat processor enables parallel, multicore processing of the wavelet transformation, while accepting and providing serial data.

The operations included in the above described process are for illustration purposes. Computation of wavelet transformation using multicore processors may be implemented by similar processes with fewer or additional operations. In some examples, the operations may be performed in a different order. In some other examples, various operations may be eliminated. In still other examples, various operations may be divided into additional operations, or combined together into fewer operations.

Figure 19:
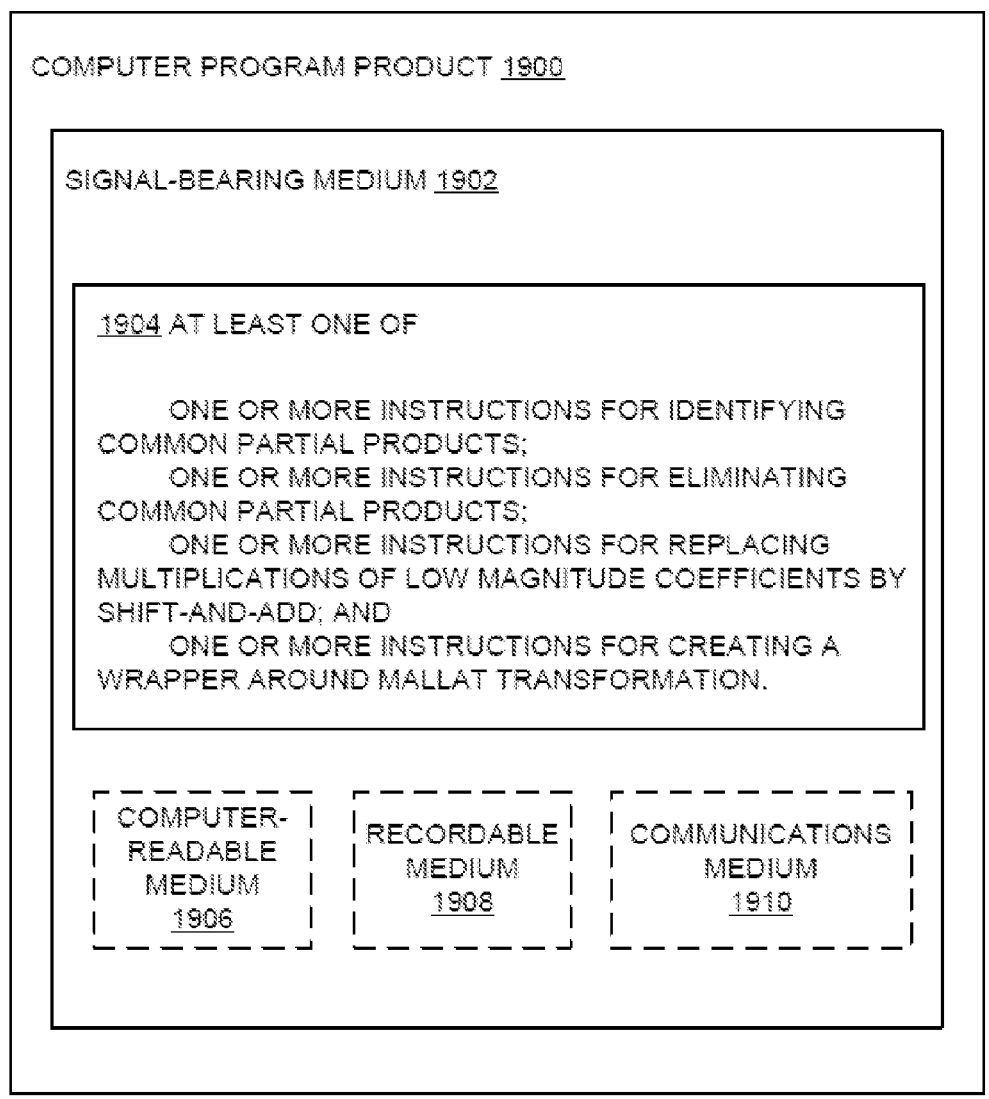
FIG. 19 illustrates a block diagram of an example computer program product, all arranged in accordance with at least some embodiments described herein.

FIG. 19 illustrates a block diagram of an example computer program product, all arranged in accordance with at least some embodiments described herein. In some examples, as shown in FIG. 19, computer program product 1900 may include a signal bearing medium 1902 that may also include machine readable instructions 1904 that, when executed by, for example, a processor, may provide the functionality described above with respect to FIG. 17. Thus, for example, referring to processor 1710, one or more of the tasks shown in FIG. 19 may be executed in response to instructions 1904 conveyed to processor 1710 by medium 1902 to perform actions associated with computation of wavelet transformation using multicore processors as described herein. Some of those instructions may include identifying common partial products, eliminating common partial products, replacing multiplications of low magnitude coefficients by CSD, and/or creating a wrapper around Mallat transformation.

In some implementations, signal bearing medium 1902 depicted in FIG. 19 may encompass a computer-readable medium 1906, such as, but not limited to, a hard disk drive, a Compact Disc (CD), a Digital Video Disk (DVD), a digital tape, memory, etc. In some implementations, signal bearing medium 1902 may encompass a recordable medium 1908, such as, but not limited to, memory, read/write (R/W) CDs, R/W DVDs, etc. In some implementations, signal bearing medium 1902 may encompass a communications medium 1910, such as, but not limited to, a digital and/or an analog communication medium (e.g., a fiber optic cable, a waveguide, a wired communications link, a wireless communication link, etc.). Thus, for example, program product 1900 may be conveyed to one or more modules of the processor 1710 by an RF signal bearing medium 1902, where the signal bearing medium 1902 is conveyed by a wireless communications medium 1910 (e.g., a wireless communications medium conforming with the IEEE 802.11 standard).

The present disclosure presents a method for wavelet based data compression. According to some examples, the method includes receiving data 102 associated with a set of pixels and computing wavelet coefficients by applying a series of Discrete Wavelet Transform (DWT) low-pass and high-pass filtering operations 114, 112. During the computation, a number of filtering operations is reduced by identifying common partial products for at least one of the low-pass filtering operations and the high-pass filtering operations 1824 and eliminating the common partial products 1826. The method may also include applying the DWT based on remaining filtering operations.

According to other examples, the method may further include classifying a first portion of the wavelet coefficients as low magnitude coefficients and a second portion of the wavelet coefficients as high magnitude coefficients, eliminating the common partial products for the high magnitude wavelet coefficients, and replacing multiplication operations 1502, 1506 for the low magnitude wavelet coefficients with shift-and-add operations 1514, 1518.

According to further examples, the method may further include one or more of performing the shift-and-add operation 1514 employing a Canonical Signed Digit (CSD) encoding, performing the DWT transform by a plurality of processing elements 1010 in a multicore processor with each processing element including a high-pass filter element 112, a low-pass filter element 114, and a decimation element 116, receiving the data associated with the set of pixels as a data stream at a Serial-In-Parallel-Out (SIPO) component 104, providing an output of the SIPO component to the processing elements 1010, receiving an output of the multicore processor at a Parallel-In-Serial-Out (PISO) component 124, and/or providing the compressed data associated with the pixels as a data stream from an output of the PISO component 124.

According to yet other examples, the method may further include sorting the wavelet coefficients based on their respective magnitudes, computing the wavelet coefficients starting with largest wavelet coefficient (404, 504), and applying the DWT based on a partial sum that includes fewer than all wavelet coefficients depending on a predefined error limit. The set of pixels may be associated with one of a still image and a video stream.

According to yet further examples, the method may include employing five low-pass filter stages (1500), where the common partial products are eliminated for first 1500, second 1502, and fifth 1510 wavelet coefficients and multiplication operations for third 1518 and fourth 1514 wavelet coefficients are replaced with shift-and-add operations, and/or employing four high-pass filter stages 1600, where the common partial products are eliminated for first 1602 and fourth 1604 wavelet coefficients and multiplication operations for second 1612 and third 1608 fourth wavelet coefficients are replaced with shift-and-add operations.

The present disclosure also presents another method for wavelet based data compression, which may include receiving data associated with a set of pixels, word-serially loading each pixel to a multicore processor 1822 for Discrete Wavelet Transform (DWT) performed by a series of low-pass and high-pass filtering operations, and applying the DWT based on remaining filtering operations. A number of filtering operations in the computation process may be reduced by identifying common partial products 1824 for at least one of the low-pass filtering operations and the high-pass filtering operations, sorting wavelet coefficients resulting from the filtering operations based on their respective magnitudes, classifying a first portion of the wavelet coefficients as low magnitude coefficients and a second portion of the wavelet coefficients as high magnitude coefficients, eliminating common partial products 1826 for the high magnitude wavelet coefficients, and/or replacing multiplication operations 1502, 1506 for the low magnitude wavelet coefficients with shift-and-add operations 1514, 1518.

According to some examples, the other method may further include unloading each transformed value in a word-serial manner 1832 and loading the pixels 1822 and unloading the transformed values 1832 in a First In First Out (FIFO) manner. The partial products may be computed starting with a largest wavelet coefficient such that the computation converges on a final sum of products.

According to other examples, the other method may also include employing a plurality of processing elements 1010 with four two-stage pipeline inputs each to apply the DWT, wherein one pair of the of the pipelines for each processing element are dedicated to low-pass computations 114 and another pair of the pipelines for each processing element are dedicated to high-pass computations 112. One pipeline of each pair of pipelines may be fed at the positive edge of a clock signal (1004) and another pipeline of each pair of pipelines is fed at the negative edge of the clock signal (1006).

According to further examples, the other method may further include providing outputs of the plurality of processing elements to a first adder 1012 at the positive edge of a clock signal and to a second adder 1014 at the negative edge of the clock signal and providing transformed values at outputs of the first and second adders to one of a buffer and a Random Access Memory (RAM) 1002, 1008 for word-serial unloading.

According to yet other examples, the other method may further include providing low-pass outputs of the plurality of processing elements to a first adder 1406 at the positive edge of a clock signal and to a second adder 1408 at the negative edge of the clock signal and providing high-pass outputs of the plurality of processing elements to a third adder 1410 at the positive edge of a clock signal and to a fourth adder 1412 at the negative edge of the clock signal. The first, second, third, and fourth adders 1406-1412 may be operated as tree adders.

The present disclosure further presents an integrated circuit (IC) 100 adapted to perform wavelet based data compression. According to some examples, the IC may include a first network-on-chip (NOC) 104 adapted to receive data associated with a set of pixels and word-serially load each pixel to a plurality of cores and the plurality of cores 110 each core comprising a high-pass processing element and a low-pass processing element to perform Discrete Wavelet Transform (DWT). The plurality of cores may identify common partial products for at least one of the low-pass filtering operations and the high-pass filtering operations and eliminate the common partial products in performing the DWT. The IC may also include a second NOC 124 adapted to unload each transformed value in a word-serial manner from the plurality of cores.

According to other examples, the plurality of cores 110 of the IC may sort wavelet coefficients resulting from the filtering operations based on their respective magnitudes, classify a first portion of the wavelet coefficients as low magnitude coefficients and a second portion of the wavelet coefficients as high magnitude coefficients, eliminate common partial products for the high magnitude wavelet coefficients 1826, replace multiplication operations for the low magnitude wavelet coefficients with shift-and-add operations 1828, and/or compute the wavelet coefficients starting with largest wavelet coefficient such that the computation converges on a final sum of products.

As with the presented method, the shift-and-add operations 1518 performed by the IC may be performed using a Canonical Signed Digit (CSD) encoding. Each core may further include a decimation element 116. The first NOC 104 may be a Serial-In-Parallel-Out (SIPO) component, and the second NOC 124 may be a Parallel-In-Serial-Out (PISO) component. Moreover, the processing elements 1010 may include four two-stage pipeline inputs each with one pair of the of the pipelines for each processing element dedicated to low-pass computations and another pair of the pipelines dedicated to high-pass computations.

According to further examples, one pipeline of each pair of pipelines may be fed at the positive edge of a clock signal (1004) and another pipeline of each pair of pipelines is fed at the negative edge of the clock signal (1006). Outputs of the processing elements may be provided to a first adder 1012 at the positive edge of a clock signal and to a second adder 1014 at the negative edge of the clock signal. The IC may further include a buffer or a Random Access Memory (RAM) 1002, 1008 adapted to receive transformed values from the first and second adders for word-serial unloading. Low-pass outputs of the processing elements may be provided to a first adder 1406 at the positive edge of a clock signal and to a second adder 1408 at the negative edge of the clock signal, and high-pass outputs of the processing elements may be provided to a third adder 1410 at the positive edge of a clock signal and to a fourth adder 1412 at the negative edge of the clock signal. The first, second, third, and fourth adders 1406-1412 may be operated as tree adders.

There is little distinction left between hardware and software implementations of aspects of systems; the use of hardware or software is generally (but not always, in that in certain contexts the choice between hardware and software may become significant) a design choice representing cost vs. efficiency tradeoffs. There are various vehicles by which processes and/or systems and/or other technologies described herein may be effected (e.g., hardware, software, and/or firmware), and that the preferred vehicle will vary with the context in which the processes and/or systems and/or other technologies are deployed. For example, if an implementer determines that speed and accuracy are paramount, the implementer may opt for a mainly hardware and/or firmware vehicle; if flexibility is paramount, the implementer may opt for a mainly software implementation; or, yet again alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples may be implemented, individually and/or collectively, by a wide range of hardware, software, firmware, or virtually any combination thereof. In one embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g. as one or more programs running on one or more microprocessors), as firmware, or as virtually any combination thereof, and that designing the circuitry and/or writing the code for the software and or firmware would be well within the skill of one of skill in the art in light of this disclosure.

The present disclosure is not to be limited in terms of the particular embodiments described in this application, which are intended as illustrations of various aspects. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, materials, and configurations, which can, of course, vary. It is also to be understood that the terminology used herein is for the purpose of describing particular embodiments only, and is not intended to be limiting.

In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system generally includes one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control modules (e.g., determining common partial products, replacing multiplication operations with CSD operations, and similar).

A typical data processing system may be implemented utilizing any suitable commercially available components, such as those typically found in data computing/communication and/or network computing/communication systems. The herein described subject matter sometimes illustrates different components contained within, or connected with, different other components. It is to be understood that such depicted architectures are merely exemplary, and that in fact many other architectures may be implemented which achieve the same functionality. In a conceptual sense, any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermediate components. Likewise, any two components so associated may also be viewed as being "operably connected", or "operably coupled", to each other to achieve the desired functionality, and any two components capable of being so associated may also be viewed as being "operably couplable", to each other to achieve the desired functionality. Specific examples of operably couplable include but are not limited to physically connectable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations).

Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B."

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method for wavelet based data compression, comprising:
receiving data associated with a set of pixels that represent one of an image or a video as a data stream at a serial-in-parallel-out (SIPO) component of a transform circuit;
providing an output of the SIPO component to a plurality of processor elements in a multicore processor of the transform circuit;
computing, by the multicore processor, wavelet coefficients by applying a series of discrete wavelet transform (DWT) low-pass and high-pass filtering operations performed by the plurality of processor elements, each processor element including a high-pass filter element, a low-pass filter element, and a decimation element, wherein a number of filtering operations is reduced by:
identifying common partial products for at least one of the low-pass filtering operations and the high-pass filtering operations;
classifying a first portion of the wavelet coefficients as low magnitude coefficients and a second portion of the wavelet coefficients as high magnitude coefficients;
eliminating the common partial products for the high magnitude wavelet coefficients; and
replacing multiplication operations for the low magnitude wavelet coefficients with shift-and-add operations;
applying, by the multicore processor, the DWT based on remaining filtering operations;
receiving an output of the multicore processor at a parallel-in-serial-out (PISO) component of the transform circuit; and
providing compressed data associated with the set of pixels as another data stream from an output terminal of the PISO component.

2. A method for wavelet based data compression, comprising:
receiving data associated with a set of pixels that represent one of an image or a video as a data stream at a serial-in-parallel-out (SIPO) component of a transform circuit;
providing an output of the SIPO component to a plurality of processor elements in a multicore processor of the transform circuit by word-serially loading each pixel to the multicore processor;
computing, by the multicore processor, wavelet coefficients by applying a series of discrete wavelet transform (DWT) low-pass and high-pass filtering operations performed by the plurality of processor elements, each processor element including a high-pass filter element, a low-pass filter element, and a decimation element, wherein a number of filtering operations is reduced by:
identifying common partial products for at least one of the low-pass filtering operations and the high-pass filtering operations;
sorting wavelet coefficients resulting from the filtering operations based on their respective magnitudes;
classifying a first portion of the wavelet coefficients as low magnitude coefficients and a second portion of the wavelet coefficients as high magnitude coefficients;
eliminating common partial products for the high magnitude wavelet coefficients; and
replacing multiplication operations for the low magnitude wavelet coefficients with shift-and-add operations;
unloading, by a dual random access memory (RAM), each transformed value, obtained through the DWT, in a word-serial manner;
applying, by the multicore processor, the DWT based on remaining filtering operations;
receiving an output of the multicore processor at a parallel-in-serial-out (PISO) component of the transform circuit; and
providing compressed data associated with the set of pixels as another data stream from an output terminal of the PISO component.

3. The method according to claim 2, further comprising:
providing outputs of the plurality of processor elements that perform the filtering operations to a first adder at a positive edge of a clock signal and to a second adder at a negative edge of the clock signal.

4. The method according to claim 3, further comprising:
providing transformed values at output terminals of the first and second adders to one of a dual buffer and the dual random access memory (RAM) to be word-serially unloaded.

5. The method according to claim 3, wherein providing the outputs of the plurality of processor elements to the first adder at the positive edge of the clock signal and to the second adder at the negative edge of the clock signal includes:
providing low-pass outputs of the plurality of processor elements to the first adder at the positive edge of the clock signal and to the second adder at the negative edge of the clock signal; and the method further comprises:
providing high-pass outputs of the plurality of processor elements to a third adder at the positive edge of the clock signal and to a fourth adder at the negative edge of the clock signal, wherein the first, second, third, and fourth adders are operated as tree adders.

6. A method for wavelet based data compression, comprising:
receiving data associated with a set of pixels that represent one of an image or a video as a data stream at a serial-in-parallel-out (SIPO) component of a transform circuit;
providing an output of the SIPO component to a plurality of processor elements in a multicore processor of the transform circuit;
computing, by the multicore processor, wavelet coefficients by applying a series of discrete wavelet transform (DWT) low-pass and high-pass filtering operations performed by the plurality of processor elements, each processor element including a high-pass filter element, a low-pass filter element, and a decimation element, wherein a number of filtering operations is reduced by:
identifying common partial products for at least one of the low-pass filtering operations and the high-pass filtering operations;
classifying a first portion of the wavelet coefficients as low magnitude coefficients and a second portion of the wavelet coefficients as high magnitude coefficients;
eliminating the common partial products for the high magnitude wavelet coefficients; and
replacing multiplication operations for the low magnitude wavelet coefficients with shift-and-add operations;
applying, by the multicore processor, the DWT based on remaining filtering operations;
receiving an output of the multicore processor at a parallel-in-serial-out (PISO) component of the transform circuit; and providing compressed data associated with the set of pixels as another data stream from an output terminal of the PISO component.

7. The method according to claim 6, wherein the shift-and-add operations employ a canonical signed digit encoding.

8. The method according to claim 6, further comprising:
sorting the wavelet coefficients based on their respective magnitudes; and
computing the wavelet coefficients starting with a largest wavelet coefficient.

9. The method according to claim 8, wherein applying the series of DWT includes:
applying the DWT based on a partial sum that includes fewer than all wavelet coefficients depending on a particular error limit.

10. The method according to claim 6, wherein the set of pixels are associated with one of a still image and a video stream.

11. A method for wavelet based data compression, comprising:
receiving data associated with a set of pixels that represent one of an image or a video;
computing wavelet coefficients by applying a series of discrete wavelet transform (DWT) low-pass and high-pass filtering operations, wherein a number of filtering operations is reduced by:
identifying common partial products for at least one of the low-pass filtering operations and the high-pass filtering operations; and
eliminating the common partial products;
applying the DWT based on remaining filtering operations; and
employing five low-pass filter stages, wherein the common partial products are eliminated for first, second, and fifth wavelet coefficients and multiplication operations for third and fourth wavelet coefficients are replaced with shift-and-add operations.

12. The method according to claim 11, further comprising:
employing four high-pass filter stages, wherein the common partial products are eliminated for first and fourth wavelet coefficients and multiplication operations for second and third wavelet coefficients are replaced with shift-and-add operations.

13. A method for wavelet based data compression, comprising: receiving data associated with a set of pixels that represent one of an image or a video as a data stream at a serial-in-parallel-out (SIPO) component of a transform circuit;
providing an output of the SIPO component to a plurality of processor elements in a processor of the transform circuit by word-serially loading pixels to the processor;
computing, by the processor, wavelet coefficients by applying a series of discrete wavelet transform (DWT) low-pass and high-pass filtering operations performed by the plurality of processor elements, each processor element including a high-pass filter element, a low-pass filter element, and a decimation element, wherein a number of filtering operations is reduced by:
identifying common partial products for at least one of the low-pass filtering operations and the high-pass filtering operations;
sorting wavelet coefficients resulting from the filtering operations based on their respective magnitudes;
classifying a first portion of the wavelet coefficients as low magnitude coefficients and a second portion of the wavelet coefficients as high magnitude coefficients;
eliminating common partial products for the high magnitude wavelet coefficients; and
replacing multiplication operations for the low magnitude wavelet coefficients with shift-and-add operations;
applying, by the processor, the DWT based on remaining filtering operations;
receiving an output of the processor at a parallel-in-serial-out (PISO) component of the transform circuit; and
providing compressed data associated with the set of pixels as another data stream from an output terminal of the PISO component.

14. The method according to claim 13, further comprising:
unloading each transformed value, obtained through the DWT, in a word-serial manner.

15. The method according to claim 14, wherein word-serially loading each pixel from the set of the pixels to the processor includes word-serially loading each pixel from the set of pixels to a multicore processor.

16. The method according to claim 13, further comprising:
computing the partial products starting with a largest wavelet coefficient such that the computation converges on a final sum of products.

17. The method according to claim 16, wherein
each processor element includes four two-stage pipeline inputs such that one pair of the pipeline inputs is dedicated to low-pass computations and another pair of the pipeline inputs is dedicated to high-pass computations.

18. The method according to claim 17, wherein one pipeline input of each pair of pipeline inputs is fed at a positive edge of a clock signal and another pipeline input of each pair of pipeline inputs is fed at a negative edge of the clock signal.

19. The method according to claim 18, further comprising:
providing outputs of the plurality of processor elements that perform the filtering operations to a first adder at the positive edge of the clock signal and to a second adder at the negative edge of the clock signal.

20. The method according to claim 19, further comprising:
providing transformed values at output terminals of the first and second adders to one of a buffer and a random access memory (RAM) to be word-serially unloaded.

21. The method according to claim 19, wherein providing the outputs of the plurality of processor elements to the first adder at the positive edge of the clock signal and to the second adder at the negative edge of the clock signal includes:
providing low-pass outputs of the plurality of processor elements to the first adder at the positive edge of the clock signal and to the second adder at the negative edge of the clock signal; and the method further comprises:
providing high-pass outputs of the plurality of processor elements to a third adder at the positive edge of the clock signal and to a fourth adder at the negative edge of the clock signal.

22. The method according to claim 21, wherein the first, second, third, and fourth adders are operated as tree adders.

* * * * *